(12) United States Patent
Kitani et al.

(10) Patent No.: US 8,162,478 B2
(45) Date of Patent: Apr. 24, 2012

(54) PAIR OF PROGRESSIVE POWER LENS AND METHOD FOR DESIGNING SAME

(75) Inventors: Akira Kitani, Tokyo (JP); Takashi Hatanaka, Tokyo (JP); Yoshihiro Kikuchi, Tokyo (JP); Hua Qi, Tokyo (JP)

(73) Assignee: Hoya Corporation, Tokyo (JP)

( * ) Notice: Subject to any disclaimer, the term of this patent is extended or adjusted under 35 U.S.C. 154(b) by 189 days.

(21) Appl. No.: 12/734,718

(22) PCT Filed: Dec. 3, 2008

(86) PCT No.: PCT/JP2008/071977
§ 371 (c)(1),
(2), (4) Date: May 19, 2010

(87) PCT Pub. No.: WO2009/072528
PCT Pub. Date: Jun. 11, 2009

(65) Prior Publication Data
US 2010/0271590 A1    Oct. 28, 2010

(30) Foreign Application Priority Data
Dec. 4, 2007    (JP) .................................. 2007-313873

(51) Int. Cl.
*G02C 7/06*    (2006.01)
(52) U.S. Cl. ................. 351/169; 351/172; 351/177
(58) Field of Classification Search .......... 351/161, 351/164, 168–172, 177
See application file for complete search history.

(56) References Cited

U.S. PATENT DOCUMENTS

| | | | |
|---|---|---|---|
| 6,712,467 B1 | 3/2004 | Kitani | |
| 2010/0097570 A1* | 4/2010 | Katzman et al. | 351/169 |

FOREIGN PATENT DOCUMENTS

| | | |
|---|---|---|
| EP | 1 767 983 A1 | 3/2007 |
| JP | A-5-341238 | 12/1993 |
| JP | A-7-36003 | 2/1995 |
| JP | B2-3788083 | 6/2006 |
| JP | A-2006-285200 | 10/2006 |
| KR | A-2001-0108392 | 12/2001 |
| WO | WO 2006/001409 A1 | 1/2006 |

OTHER PUBLICATIONS

International Search Report for International Application No. PCT/JP2008/071977, mailed on Mar. 3, 2009.

* cited by examiner

*Primary Examiner* — Darryl J Collins
(74) *Attorney, Agent, or Firm* — Oliff & Berridge, PLC

(57) ABSTRACT

An object is to reduce the inconvenience given to the binocular vision function when wearing and using spectacles making use of a pair of progressive power lenses having different distance dioptric power for right and left. For this reason, the present invention associates, in a pair of progressive power lenses corresponding to the right and left eyes, an average dioptric power distribution and an astigmatism distribution determined from prescribed dioptric power and a wear state of one of the progressive power lenses with an average dioptric power distribution and an astigmatism distribution determined from prescribed dioptric power and a wear state of the other progressive power lens, and thereby average dioptric power distributions and astigmatism distributions of the respective progressive power lenses are changed.

10 Claims, 16 Drawing Sheets

L1    L2    L3

ASTIGMATISM (STANDARD)

AVERAGE DIOPTRIC POWER (STANDARD)

ASTIGMATISM (DISPERSION)

AVERAGE DIOPTRIC POWER (DISPERSION)

ASTIGMATISM (CONCENTRATION)

AVERAGE DIOPTRIC POWER
(CONCENTRATION)

PAIR OF PROGRESSIVE POWER LENS AND METHOD FOR DESIGNING SAME

TECHNICAL FIELD

The present invention relates to a pair of progressive (refractive) power lenses with continuously varying (refractive) power in a multifocal spectacle lens having addition power to compensate for lack of power of accommodation in presbyopia, and a method for designing the same.

BACKGROUND ART

A progressive power lens is widely used in general because of an advantage that in appearance it is hardly detected from others as a spectacle for the aged in spite of a spectacle lens for presbyopia, an advantage that it allows a wearer to clearly look continuously from a far distance to a near distance without discontinuity, and so on. However, it is widely known that it presents disadvantages specific to the progressive power lens such that due to the necessity of arrangement of a plurality of visual fields such as a field for looking far, a field for looking near, and a field for looking at a distance intermediate therebetween, without a boundary line existing within a limited lens area, each visual field is not always sufficiently wide, and that there is a region mainly in a side visual field which causes the wearer to feel distortion or sway of an image.

Although many related arts have been proposed to improve these disadvantages, most of the related arts are related to designing techniques to give more preferred average dioptric power distribution or aberration distribution depending on the individual prescribed dioptric power and the wear state, and those focusing on the combination of right and left lenses and aiming for the improvement of a binocular vision function of right and left eyes are extremely scarce.

In these related arts, since design is carried out depending on the individual prescribed dioptric power and the wear state, the designs of right and left lenses become identical as long as the prescribed dioptric power and the wear state for right and those for left are the same. In this regard, since the directions of convergence of lines of sight in near vision become opposite between right and left, to express it more accurately, they are designed so as to be reflected in a mirror with the center between both eyes as a symmetric axis (generally referred to as mirror symmetry). The average dioptric power distribution and the aberration distribution are generally treated as "design" specific to each progressive power lens.

With the progress in designing techniques in recent years, designing methods to add "corrective action" have been enabled in order to eliminate or reduce the occurrence of astigmatism and variation in dioptric power mainly caused by a line of sight and a lens surface not being able to be orthogonal. This utilizes an optical designing technique referred to as ray tracing and is generally called "transmission design" and "aspherical design", which is a designing method for obtaining an original optical function in a situation where a wearer actually wears the lenses. Any of an outer surface, an inner surface, and both surfaces of a lens can be subjected to the "corrective action" in principle, and due to the progress in the processing technology in recent years, the corrective action does not need to have been applied to a semifinished product prepared in advance but also it can also be applied by designing after receipt of an order.

However, the contents of the "corrective action" in conventional techniques are intended mainly to eliminate and reduce the occurrence of aberration and the variation in dioptric power associated with strong dioptric power and cylindrical dioptric power, and the design is only carried out depending on the prescribed dioptric power and the wear state of individual right and left eyes, so that it does not correspond to the difference between prescribed dioptric power of the right and left eyes.

As one of the conventional techniques to improve the inconvenience of a person who wears spectacles having different right and left dioptric powers, there has been a processing technology referred to as slab-off since early times. This mainly subjects only one region of a distance portion or a near portion of a lens to a cutoff processing for providing a vertical prismatic effect in order to eliminate a vertical prism difference in right and left near visions. Regarding this slab-off, as a more detailed resource disclosed to public, there are "'82 HOYA Senior Lens Fabrication Dioptric Power Range Table (since February 1, 1987) p. 45" and the like.

In the above-described conventional technique, there are disadvantages, that a boundary line (ridge line of bending surfaces) of two types of intersecting surfaces is generated at the border between the distant and close regions of a lens subjected to a cutoff processing, thereby being distinct and that a jump of an image, referred to as an image jump, is generated as a result of an abrupt change in the prismatic effect at the boundary line as a border. It should be noted that, although the slab-off can be applied to progressive power lenses, the occurrence of a horizontal boundary line between the distant and close regions is inevitable and an important merit of "not having a boundary line" in normal progressive power lenses turns out to be lost.

In addition, there has been proposed a method for eliminating or reducing a vertical prism difference in right and the left near visions without the occurrence of such a boundary line for progressive power lenses having different right and left distance dioptric powers (refer to Patent Document 1).

This technique is intended to provide a difference between the prismatic power in the near portion for right and left eyes by providing a difference in the way the dioptric power changes in right and left progressive corridors. For example, even when the addition power is the same, average addition power in progressive corridors becomes different in a case where the variation of dioptric power in the progressive corridors extending from the distance portion to the near portion increases moderately at first and rapidly at last and, on the contrary, in a case where it increases abruptly at first and gently at last, and thus a difference is generated in a vertical prismatic effect in the near portion separated below by a certain distance from the distance portion. By compensating for the prism difference, the vertical prism difference in the near portion caused by the difference between the right and left distance dioptric powers described above can be decreased. However, since the right and left addition powers in the middle of the progressive corridors are different in this method, there is a problem of the occurrence of the inconvenience for a binocular vision in intermediate vision.

The common concept in these conventional techniques is to eliminate the difference between right and left prisms itself caused by the difference between right and left distance dioptric powers. However, in the former method of slab-off to generate a boundary line, "continuity of visual field" is lost, which is extremely important for progressive power lenses. In addition, in the latter method of changing the dioptric power in the progressive corridors described in Patent Document 1, although the "continuity of visual field" is maintained, the intermediate visual field viewed through the progressive corridors is damaged.

Meanwhile, there are conventional techniques intended not to eliminate the prism difference itself but to reduce the adverse effect due to the shift of lines of sight resulted from the prism difference by changing the aberration and dioptric power distribution of the lenses.

FIG. 21 is a diagram illustrating a horizontal prism difference occurring when viewing a near visual target TN in a distance of, for example, 40 cm on the front with a left eye 12L and a right eye 12R by progressive power lenses 11L and 11R having different near dioptric power for right and left and a change in the orientation of the lines of sight by the right and left eyes resulted therefrom. Here, indexes R and L of each reference numeral or character in the drawing correspond respectively to the right and left eyes, and points OL and OR denote centers of rotation of eye, points PL0 and PR0 denote intersections of lines of sight in frontal vision with outer lens surfaces, points PL and PR denote intersections of lines of sight in near vision with outer lens surfaces, HL and HR denote amounts of displacement corresponding to convergence actions of eyes from frontal vision to near vision, broken arrows EL and ER denote directions of eye axes, and solid arrows VL and VR denote directions of lines of sight from the lenses to the visual target TN. In the example illustrated in FIG. 21, it is understood that the differences between the eye axis direction and the line-of-sight direction are different between right and left due to the difference of the prismatic effects of the right and left lenses 11L and 11R at the intersections of the lines of sight in near vision with the outer lens surfaces.

When viewing the near visual target TN on the front with the use of such progressive power lenses having different right and left near dioptric powers, in order to obtain a good binocular vision, it is desirable that the addition power at the intersections between the lines of sight and the lenses, which are passing positions of the lines of sight on the lenses, are equal to each other and the astigmatism is zero. Accordingly, it is effective to change amounts of displacement, generally referred to as "amounts of inset in near portions", in response to the near dioptric power (more in detail, horizontal components of the near dioptric power) in order to obtain a good binocular vision. Such related arts are called by the name of "ergonomic inset", "variable inset", or the like, and are already commercialized.

In addition, for example, progressive power lenses of a product name Evolis have been available on the market, manufactured by BBGR, in France in the year 2001 at the latest, and they are varied so as to have a small amount of the inset and a short length of the progressive corridor for presbyopia with myopia, a large amount of the inset and a long progressive corridor for presbyopia with hyperopia, and an intermediate amount and length between them for presbyopia with emmetropia.

These designing approaches are designed with an intention of "not reducing the difference itself between right and left prisms but reducing a secondary adverse effect therefrom".

However, these related arts only classify the changes in the passing positions of the line of sight in near vision extremely simply and cope with them, which cannot be sufficient improvement.

For example, the related arts, such as "ergonomic inset" and "variable inset", cope only with horizontal positional shifting and do not cope with vertical positional shifting.

In addition, the Evolis classifies the distance dioptric power only into three types of myopia, hyperopia, and emmetropia. Accordingly, no matter how greatly the right and left distance dioptric powers differ, they are subjected to no improvement in a case where the right and left eyes are classified as being the same. Even if right and left classifications are different, since there are only three types of classifications, an improvement deals with only three types of combinations of "myopia and emmetropia, emmetropia and hyperopia, and myopia and hyperopia", which cannot be said as an improvement in response to the dioptric power difference between the right and left distance dioptric powers.

Even if the distance dioptric power is classified even more finely and various combinations of an amount of inset and a length of the progressive corridor are set in accordance with the classification, the configuration of determining the design for single eye by the use of the distance dioptric power for the single eye does not change. That is, as long as the relationship with another distance dioptric power on the other side is not considered, the progressive power lenses cannot be regarded as corresponding to the binocular vision.

Moreover, these related arts propose only the position alignment of near visual fields of the right and left eyes, and there is no conventional technique that proposes an improvement of a binocular visual field in all visual field regions of progressive power lenses, such as distant vision, side vision, near vision, and intermediate vision.

In addition, there has been proposed techniques that allow viewing an object in the same posture as in the "previous lens" in response to the dioptric power change and the refractive index change of the material due to the replacement of progressive power lenses (for example, refer to Patent Document 2). However, in this case, the invention is merely intended to reduce a feeling of difference from the "previous lens" by the replacement of the spectacles and is not intended to improve the binocular visual field.

Further, although there are generally known techniques to, for example, align curves and thicknesses on the front side of the right and left lenses with each other in a case where the difference of dioptric power is present, they are neither the techniques to disclose an improvement of binocular visual fields of all visual field regions in progressive power lenses such as distant vision, side vision, near vision, and intermediate vision, in the configuration of the progressive power lenses described above, nor the techniques to propose configurations of an average dioptric power distribution and an astigmatism distribution for a binocular vision.

[Patent Document 1] Japanese Patent Publication No. 3788083

[Patent Document 2] Japanese Unexamined Patent Application Publication No. 2006-285200

DISCLOSURE OF THE INVENTION

Problems to be Solved by the Invention

As described above, among conventional techniques, there has not been disclosed a technique to reduce or eliminate the inconvenience of spectacles with right and left progressive power lenses having different distance dioptric powers in the binocular vision function of a wearer.

Fundamentally, a binocular vision function means an advanced function such as simultaneous vision, stereoscopic vision, or fusion, possessed by a visual system including the brain, and is not a function possessed by spectacles or lenses of spectacles. However, all these functions such as simultaneous vision, stereoscopic vision, and fusion are based on the premise of good binocular vision, and it is obvious that the use of spectacles to impede binocular vision results in impairing the binocular vision function. Accordingly, by providing spectacles that impede the binocular vision less, the original binocular vision function possessed by the visual system of a spectacle wearer can be sufficiently exerted.

In view of the above problems, it is an object of the present invention to provide a pair of progressive power lenses in which the inconvenience in the binocular vision function is reduced when wearing and using spectacles that use right and left progressive power lenses having different distance dioptric powers, and a method for designing the same.

In order to solve the problems mentioned above, the present invention provides a method for designing a pair of progressive power lenses having different right and left distance dioptric powers, including the steps of:

dividing lens components of the pair of progressive power lenses into a pair of progressive power lens components having equal right and left distance dioptric powers and addition powers and a pair of single-vision lens components having different right and left dioptric powers;

calculating, in a case of wearing lenses having the single-vision lens components for binocular vision, ratios of displacement distances of lines of sight on the lenses for right and left eyes when moving the lines of sight from a front distance to a distance other than a front towards a predetermined azimuthal angle;

carrying out correction in accordance with the ratios to an average dioptric power distribution and an astigmatism distribution of a lens component for a single eye or both eyes of lenses having the progressive power lens components, wherein the occurrence of aberration other than the right and left distance dioptric power difference is thereby suppressed in differences of average dioptric power and astigmatism relative to right and left lines of sight in binocular vision.

In addition, the present invention provides a pair of right and left progressive power lenses having different distance dioptric powers, wherein, in a case where lens components of the pair of progressive power lenses are divided into a pair of progressive power lens components having equal distance dioptric power and addition power between right and left and a pair of single-vision lens components having different dioptric powers between right and left, in accordance with a ratio of displacement distances of lines of sight of right and left eyes calculated on lenses when wearing the lenses having the single-vision lens components and moving lines of sight from a front distance to a distance other than a front towards a predetermined azimuthal angle, an average dioptric power distribution and an astigmatism distribution of a lens component for a single eye or both eyes having the progressive power lens components are corrected, and the occurrence of aberration other than the right and left distance dioptric power difference is suppressed in differences of average dioptric power and astigmatism relative to right and left lines of sight in binocular vision.

As described above, in the pair of progressive power lenses and the method for designing the same according to the present invention, the lens component of each of the right and left progressive power lenses is divided into a pair of progressive power lens components having equal distance dioptric power and addition power between right and left and a pair of single-vision lens components having different distance dioptric powers between right and left to be subjected to modification in design in which the average dioptric power distribution and the aberration distribution of the progressive power lens components are concentrated or dispersed at an appropriate ratio.

Then, as an index of the ratio, a ratio of displacement amounts of the line of sight on the right and left progressive power lenses is used. In a case of using a lens of reference dioptric power, a ratio of the amounts of displacement of the lines of sight in the lens of the reference dioptric power and the right and left progressive power lenses of prescribed dioptric power is utilized. Then, by modifying the average dioptric power distribution and the astigmatism distribution of each progressive power lens based on this ratio, the optical situation at positions on the lenses through which the lines of sight of the both eyes pass, that is, the average dioptric power distribution and the astigmatism distribution can be brought closer to each other. This allows the reduction of the degree of impairing the binocular vision function of a wearer.

That is, according to the method for designing a pair of progressive power lenses of the present invention, in a case of preparing spectacles of progressive power lenses for a patient having a dioptric power difference between the prescribed dioptric powers of the right and left eyes, it is possible to provide a method for designing a pair of progressive power lenses that reduces the inconvenience in the binocular vision function caused by the dioptric power difference.

BEST MODE FOR CARRYING OUT THE INVENTION

Figure 1A:
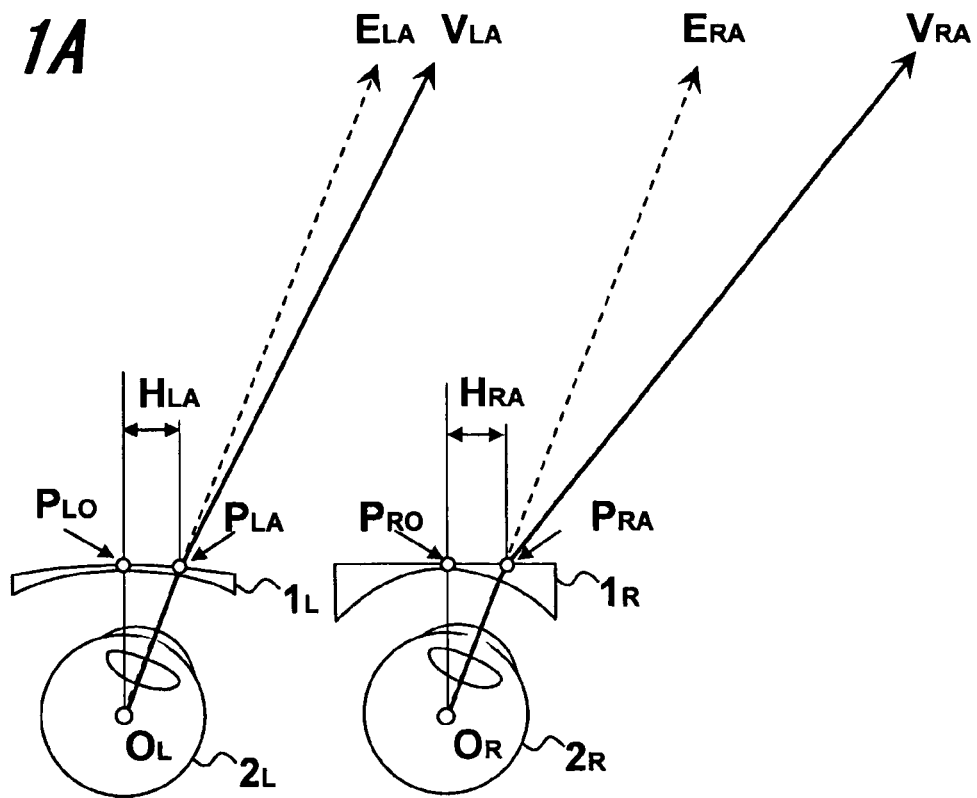
FIGS. 1A and 1B are explanatory drawings illustrating a difference in displacement of binocular vision in right side vision in progressive power lenses of minus dioptric power having different right and left dioptric powers.

Although a description will be given below to examples of the best mode for carrying out the present invention, the present invention is not limited to the examples below.

First, a description will be given, using the drawings, to problems of a binocular vision function of a person who wears spectacles which use a pair of progressive power lenses designed based on the prescription in which right and left distance dioptric powers are different in prescribed dioptric power.

FIGS. 1A to 8B are diagrams illustrating eye axis directions E and line-of-sight directions V when a person who wears progressive spectacles having different distance dioptric power between the right and left eyes views directions other than the front with both eyes.

FIGS. 1A to 4B are diagrams when viewing particularly side directions with both eyes, and all are the diagrams viewed from overhead of the spectacle wearer. FIGS. 5A and 5B to 8A and 8B are diagrams when looking particularly upward and downward with both eyes, and all are the diagrams viewed from a side of the spectacle wearer.

Each of all the drawings is a diagram illustrating a horizontal or vertical prism difference generated when viewing infinite distance with a left eye 2L and a right eye 2R with progressive power lenses 1L and 1R having different right and left distance dioptric powers, and a change in the direction of lines of sight of the right and left eyes resulted therefrom.

It should be noted that, although the directions of the eye axes and the lines of sight are slightly different ophthalmic-optically in a strict sense, influence of the difference is of a substantially negligible degree, so that they are treated as being substantially the same for explanation. Accordingly, the difference in the directions of the eye axes and the lines of sight is considered to be caused only by a prismatic action of the lenses. Of course, in a case where the difference is required to be incorporated, it is possible to cope with the case by incorporating the difference as a correction value.

The reference numerals and characters used in the drawings are described as follows.

The index R for reference characters in each of the drawings from FIGS. 1A to 8B is an abbreviation of Right and L is an abbreviation of Left, and they mean the right eye and the left eye, respectively, in an indication of a direction or in a lens.

In addition, the index A for reference characters used in each of the drawings from FIGS. 1 to 8 is used for the A series of drawings (FIGS. 1A to 8A) and the index B for reference characters is used for the B series of drawings (FIGS. 1B to 8B).

The points OL and OR denote centers of rotation of eye, the points PL0 and PR0 denote intersections of the lines of sight when viewing front distance with the outer lens surfaces, the points PLA and PRA, and PLB and PRB denote intersections of lines of sight and eye axes when directing the eyes to a distance other than the front (lateral, up and down, diagonal) with outer lens surfaces, the reference character HLA, the reference character HRA, the reference character HLB, and the reference character HRB denote horizontal distances between front distant viewpoints and other-than-front distant viewpoints on outer surfaces of the right and left lenses respectively in the A and B series of drawings, the reference character ELA, the reference character ERA, the reference character ELB, and the reference character ERB indicated by broken arrows denote respective directions of the eye axes, and the reference character VLA, the reference character VRA, the reference character VLB, and the reference character VRB indicated by solid arrows denote respective line-of-sight directions forward from outer lens surfaces.

It should be noted that, in FIGS. 1A to 8B, the right and left eye axis directions are indicated in parallel but the right and left line-of-sight directions are not in parallel in the A series of drawings (FIGS. 1A to 8A), while the right and left line-of-sight directions are indicated in parallel but the right and left eye axis directions are not in parallel in the B series of drawings (FIGS. 1B to 8B).

Next, a description will be given to the contents of FIGS. 1A to 8B.

Figure 1B:
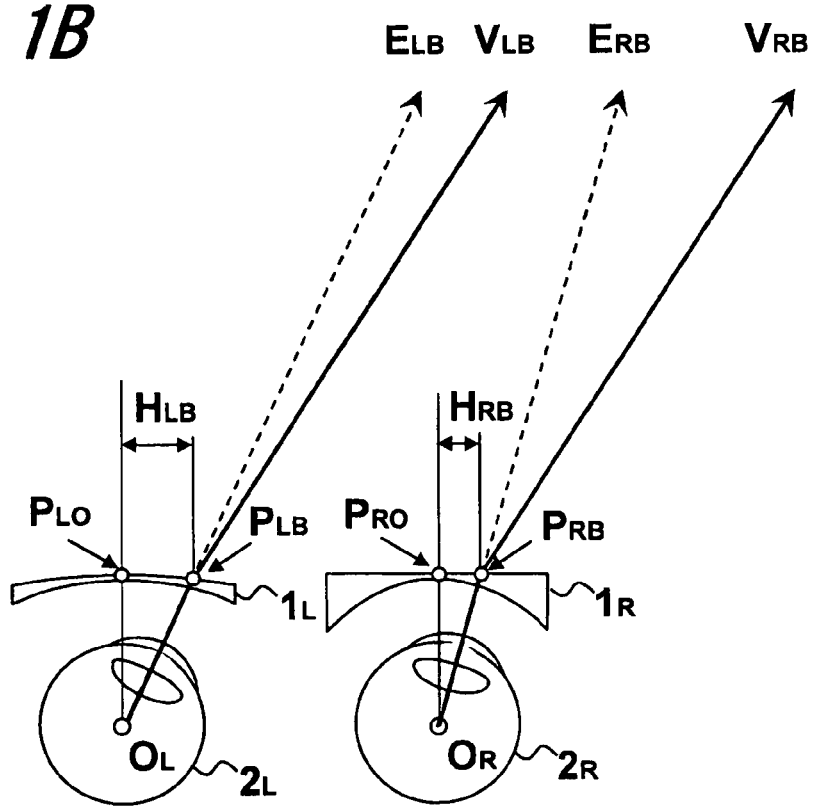

FIGS. 1A and 1B are diagrams illustrating eye axis directions and line-of-sight directions when a person who wears spectacles having distance dioptric power of the right eye more negative compared with the left eye views a right side distance with both eyes.

FIG. 1A is an explanatory drawing for inconvenience and discrepancy in the concept of conventional progressive design that does not consider the dioptric power difference between right and left. As described above, progressive power lenses of a conventional technique deal with the convergence action in near vision by way of a design so as to be reflected in a mirror with the center between both eyes as a symmetric axis (generally referred to as mirror symmetry). However, since the convergence action does not occur in distant vision, it is assumed that the eye axis directions (ELA and ERA) of the right and left eyes are in parallel and amounts of displacement (HLA and HRA) of the right and left lines of sight on the lenses in distant vision are equal. However, these apply only to a case where the right and left distance dioptric powers are equal, and the inconvenience and discrepancy occur as described below in a case of not being equal.

In FIG. 1A, the eye axis directions (ELA and ERA) of the right and left eyes are in parallel, and as a result, the amounts of displacement (HLA and HRA) on the right and left lenses are also almost equal, whereas the prismatic actions at arbitrary points (points PLA and PRA) on the outer lens surfaces become different due to the difference of the dioptric power between the right and left lenses. For this reason, the left line-of-sight direction VLA and the right line-of-sight direction VRA cannot be in parallel, and a visual target in a right side distance cannot be correctly viewed binocularly. This is because, if the line-of-sight direction VLA of the left eye correctly captures a visual target in the distance, it is impossible that the line-of-sight direction VRA of the right eye not in parallel to that captures the visual target in the distance.

It is considered that, in such an occasion, a spectacle wearer unconsciously corrects the eye axis directions to direct the right and left line-of-sight directions correctly to the visual target, which thereby allows binocular vision.

It is FIG. 1B in which this situation is drawn, where the left and right line-of-sight directions VLB and VRB are in parallel. That is, the directions of eye axes and lines of sight in binocular vision, which conventionally have been perceived incorrectly as in FIG. 1A, are drawn in accordance with the actual state in FIG. 1B.

A first problem in FIG. 1B is that the eye axis directions (ELB and ERB) of both eyes become closer to each other as they move away from the eyes. That is, it is understood that the eye axis directions (ELB and ERB) of both eyes are forced to converge in spite of distant vision, which is not accompanied by strain of accommodation.

Next, a second problem is that, in FIG. 1B, regarding the respective amounts of displacement on the right and left lenses, the amount of displacement in the left eye is larger than that of displacement in the right eye (HLB>HRB). That is, as a result of being forced to converge in spite of distant vision, a shift occurs at the positions on the lenses through which the lines of sight of both eyes pass.

As described above, since the amounts of displacement in the right and left eyes are equal (HLA=HRA) in FIG. 1A, if a spectacle wearer unconsciously corrects the eye axis directions of both eyes as in FIG. 1B, it is considered to be HLB>HLA and HRB<HRA.

When the amounts of displacement on the right and left eyes are different on the lenses in this way (HLB>HRB), average dioptric power and astigmatism turn out to be different on the lenses through which the lines of sight of the right and left eyes pass.

Accordingly, by configuring the design (average dioptric power distribution and astigmatism distribution) of the right and left progressive power lenses not in mirror symmetry as in conventional techniques but in a different configuration and by substantially approximating the average dioptric power and the astigmatism on the lenses through which the lines of sight of the right and left eyes pass, impediments to binocular vision can be prevented.

Figure 2A:
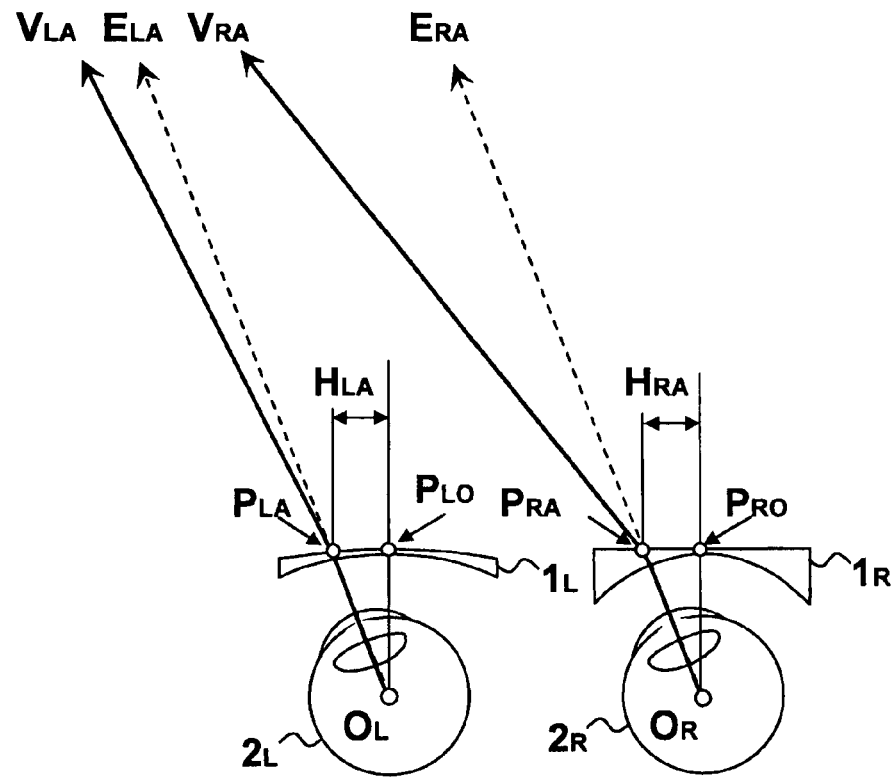
FIGS. 2A and 2B are explanatory drawings illustrating a difference in displacement of binocular vision in left side vision in progressive power lenses of minus dioptric power having different right and left dioptric powers.
Figure 2B:
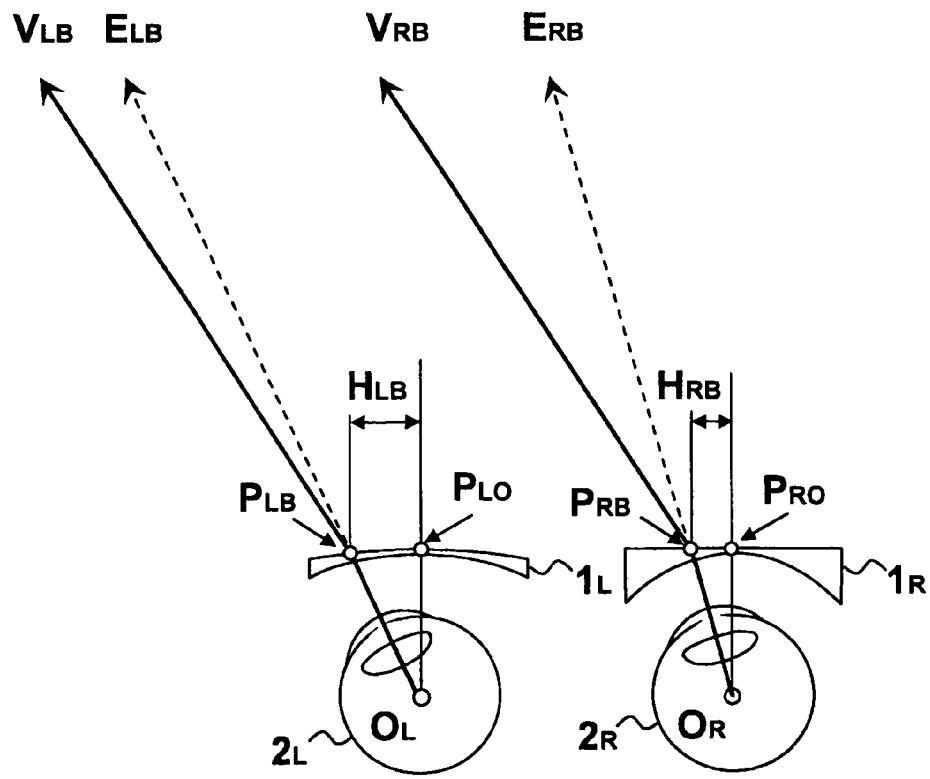

FIGS. 2A and 2B are diagrams illustrating eye axis directions and line-of-sight directions when a person who wears the same spectacles as those in FIGS. 1A and 1B views a left side distance. The difference from FIG. 1B described above is that the eye axis directions (ELB and ERB) of the both eyes in FIG. 2B are separated as they move away from the eyes. That is, the eye axis directions (ELB and ERB) of the both eyes are forced to diverge in spite of distant vision, which is not accompanied by relaxation of accommodation. The occurrence of problems due to this is similar to the above description.

Figure 3A:
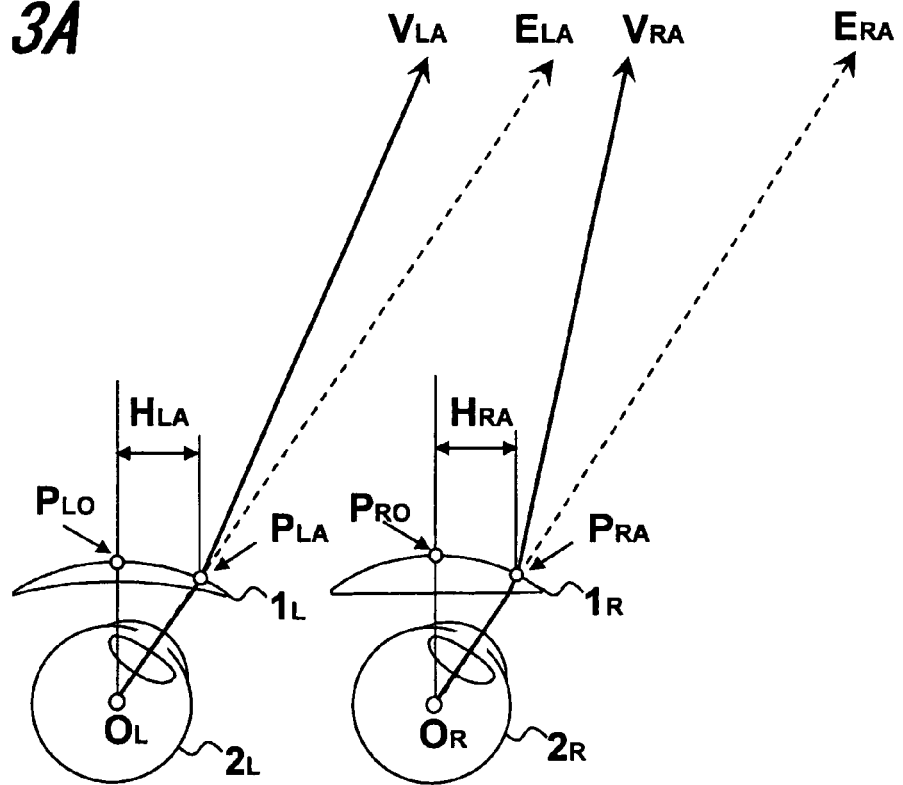
FIGS. 3A and 3B are explanatory drawings illustrating a difference in displacement of binocular vision in right side vision in progressive power lenses of plus dioptric power having different right and left dioptric powers.
Figure 3B:
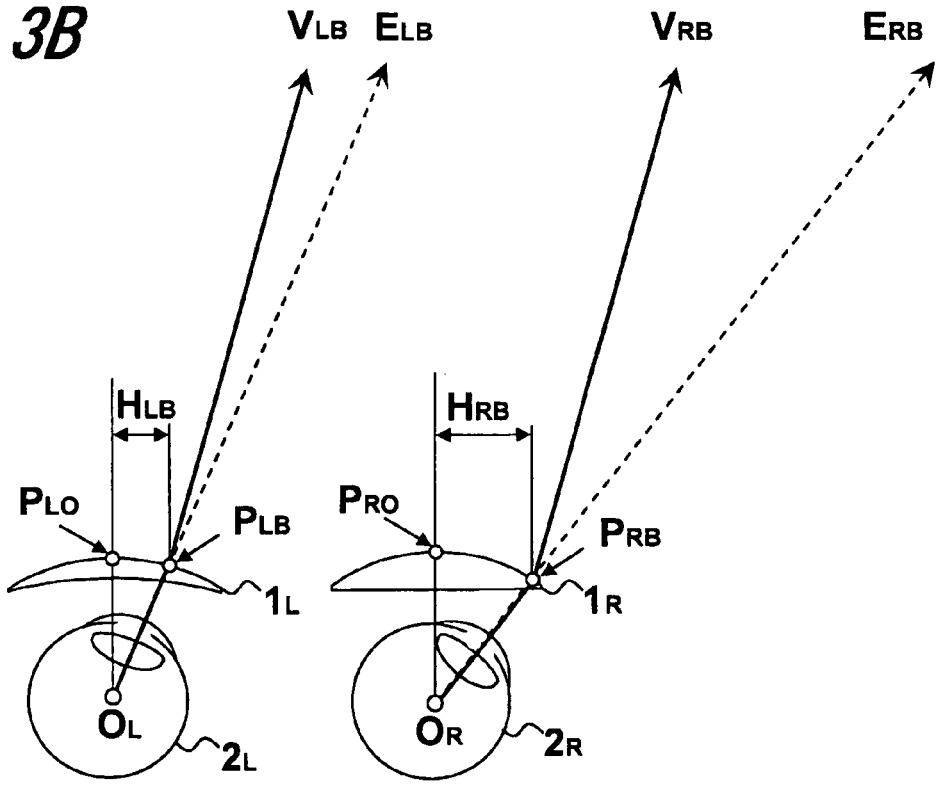

FIGS. 3A and 3B are diagrams illustrating eye axis directions and line-of-sight directions when a person who wears spectacles having distance dioptric power of the right eye more positive compared with the left eye views a right side distance with both eyes.

In a case where the spectacles of the wearer are not of negative distance dioptric power but of positive distance dioptric power, the situation becomes exactly opposite. The difference from FIG. 1B described above is that the inclination of the amounts of displacement in the right and left eyes on the lenses are opposite in FIG. 3B (HLB<HRB). As a result, the eye axis directions (ELB and ERB) of the both eyes are forced to diverge in spite of distant vision, which is not accompanied by relaxation of accommodation.

Figure 4A:
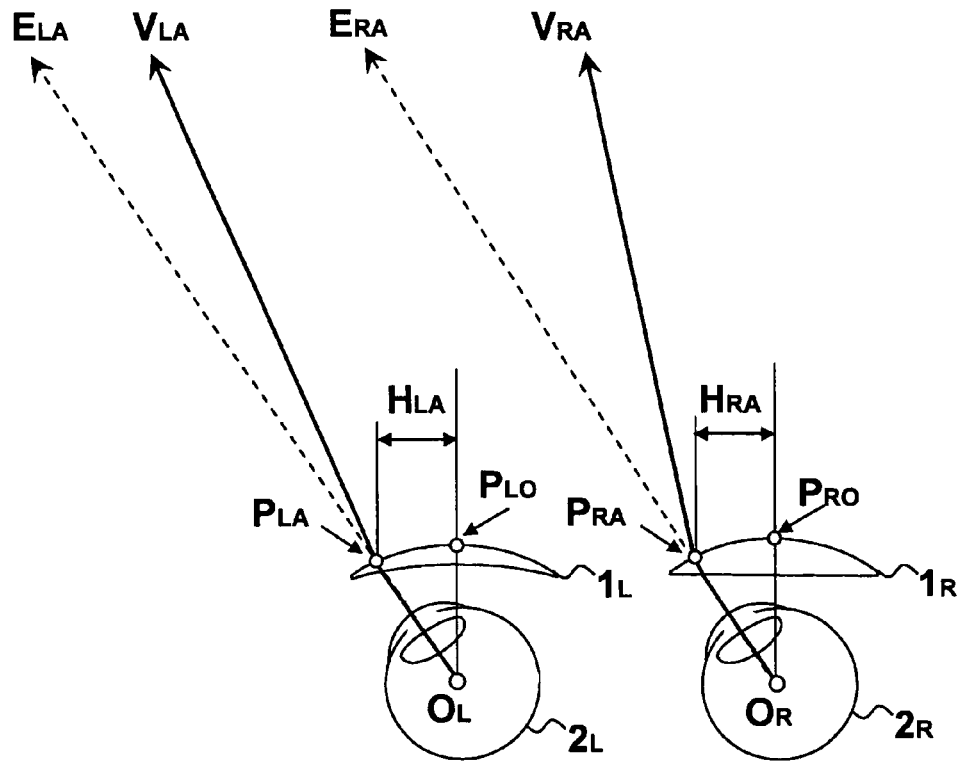
FIGS. 4A and 4B are explanatory drawings illustrating a difference in displacement of binocular vision in left side vision in progressive power lenses of plus dioptric power having different right and left dioptric powers.
Figure 4B:
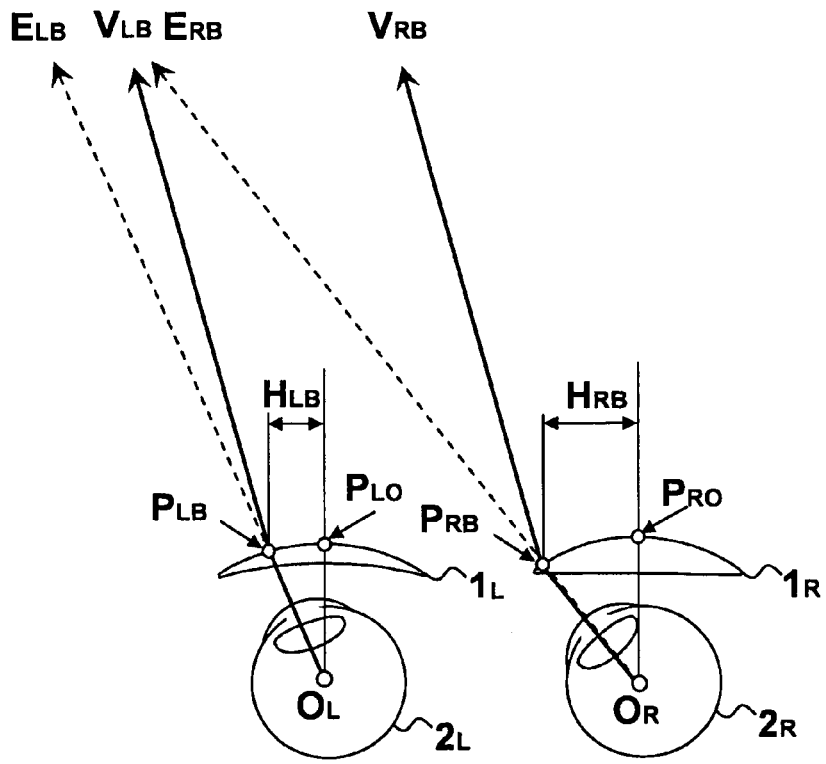

FIGS. 4A and 4B are diagrams illustrating eye axis directions and line-of-sight directions when a person who wears spectacles views a left side distance. The difference from FIG. 1B described above is that the inclination of the amounts of displacement in the right and left eyes on the lenses are opposite in FIG. 4B (HLB<HRB). As a result, the eye axis directions (ELB and ERB) of the both eyes are forced to converge in spite of distant vision, which is not accompanied by strain of accommodation.

As just described, in a case where a person who wears spectacles having different right and left distance dioptric powers views binocularly right and left side distances, the inconvenience occurs that unnatural convergence or divergence, not accompanied by strain of accommodation or relaxation of accommodation, is forced. In addition, since such convergence or divergence turns out to change the positions on the lenses through which the lines of sight of the right and left eyes pass, a difference occurs in changes in aberration or dioptric power for the both eyes, which becomes an impediment to binocular vision.

Although the problems mentioned above are in a case of a visual target in the distance, there is no basic difference even when the visual target is near. In a case of near vision, although a physiological convergence action is imparted to the both eyes and the prisms and eye axis directions of the both eyes are also changed accordingly, such change is only added to the change in distant vision described above, and there is no difference in the basic situation that the right and left dioptric power difference is an impediment to binocular vision.

In addition, such inconvenience is not limited to a case where a person who wears spectacles having different right and left distance dioptric powers views binocularly right and left side distances, but similar problems occur in upper and lower binocular vision. It should be noted that the "upper and lower" in this context applies to not only a distant case but also a near case. The changes in the lines of sight and the eye axis directions that occur in association with near vision are convergence, which are not related to the upper and lower directions.

Figure 5A:
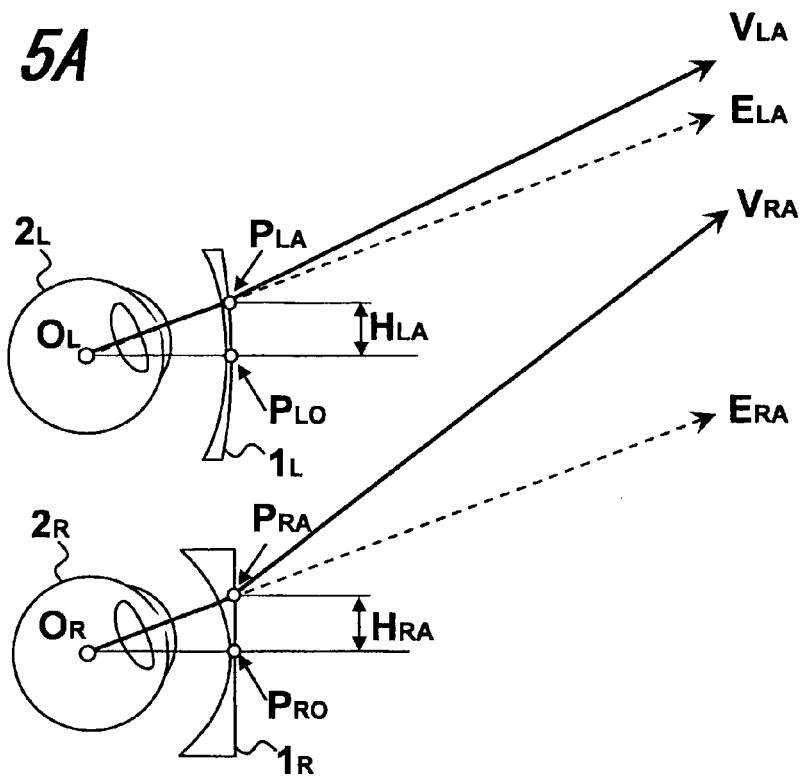
FIGS. 5A and 5B are explanatory drawings illustrating a difference in displacement of binocular vision in an upper visual field in progressive power lenses of minus dioptric power having different right and left dioptric powers.
Figure 5B:
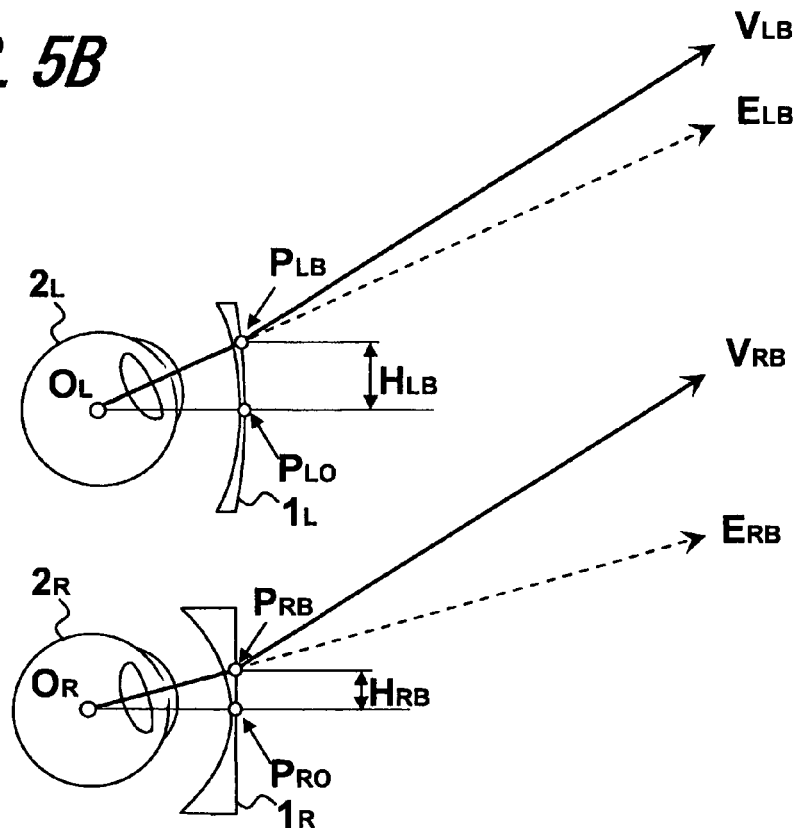

FIGS. 5A and 5B are diagrams illustrating the eye axis directions and line-of-sight directions when a person who wears spectacles having distance dioptric power of the right eye more negative compared with the left eye looks upward with both eyes, and both are the diagrams viewed from a side of the spectacle wearer. Here, for the convenience of making up the drawings, the right and left eyes are drawn by disposing them above and below. The meanings of reference characters in these drawings are identical to those in FIGS. 1A and 1B. The difference from FIG. 1B described above is that the eye axis directions (ELB and ERB) of the both eyes in FIG. 5B are separated up and down as they move away from the eyes. The same applies, as described above, not only in distant vision but also in near vision, and since FIG. 5B is a drawing viewed from a side of the spectacle wearer, the line-of-sight directions (VLB and VRB) of the both eyes in near vision are in parallel.

That is, both the occurrence of problems due to this and the method for solving the problems according to the present invention have only a difference in whether the shifting of the eye axis directions (ELB and ERB) of the both eyes is in a horizontal direction or in a vertical direction.

Figure 6A:
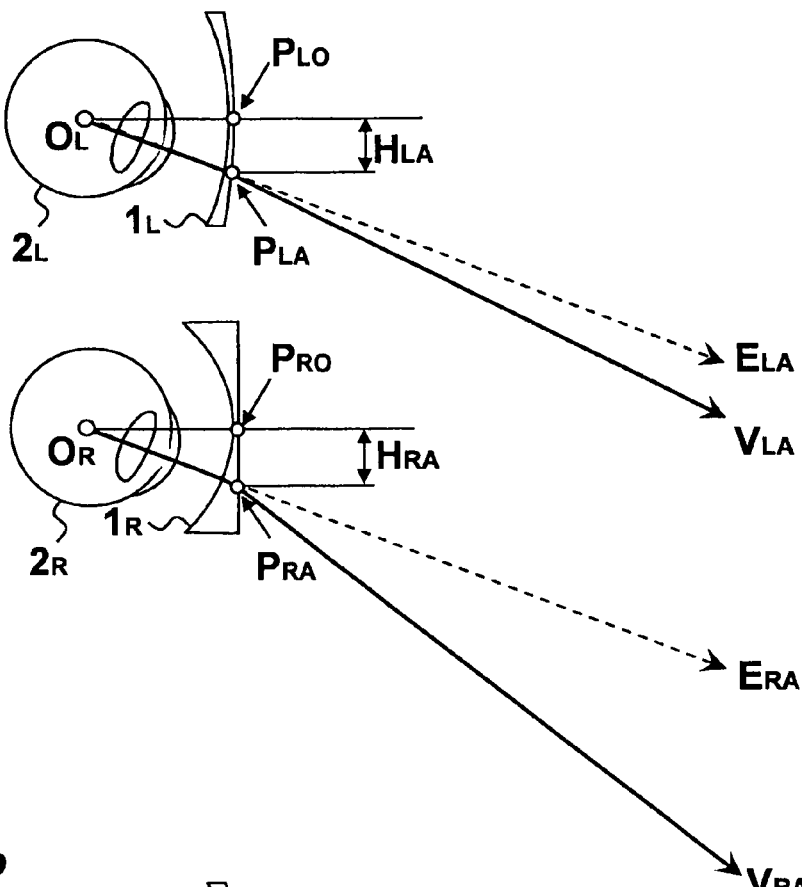
FIGS. 6A and 6B are explanatory drawings illustrating a difference in displacement of binocular vision in a lower visual field in progressive power lenses of minus dioptric power having different right and left dioptric powers.
Figure 6B:
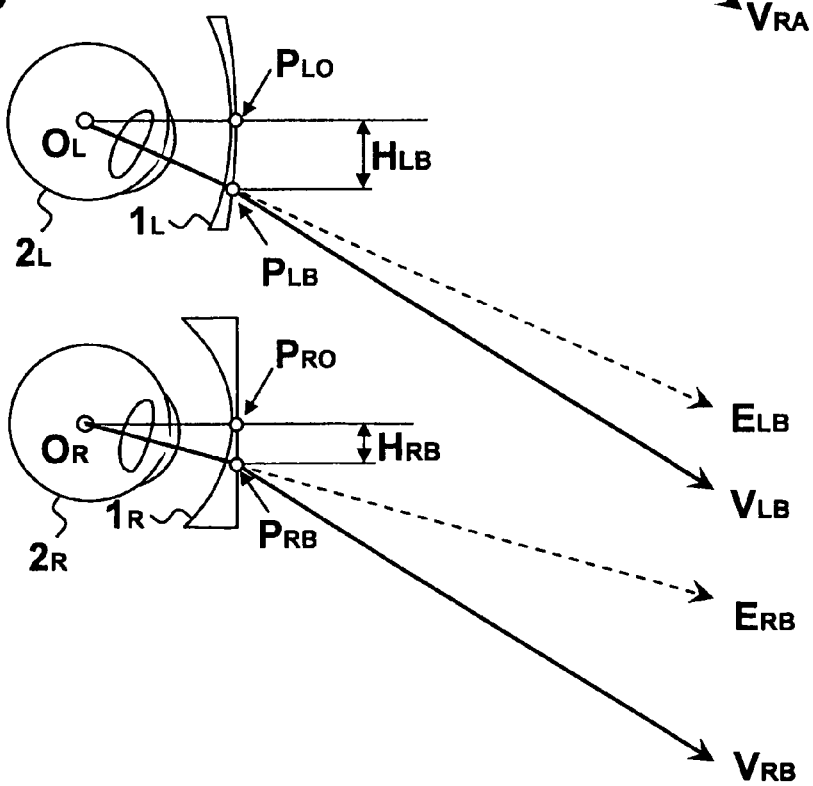

FIGS. 6A and 6B are diagrams illustrating eye axis directions and line-of-sight directions when a person who wears spectacles looks downward. The difference from FIG. 1B described above is that the eye axis directions (ELB and ERB) of both eyes in FIG. 6B become vertically closer as they move away from the eyes.

Figure 7A:
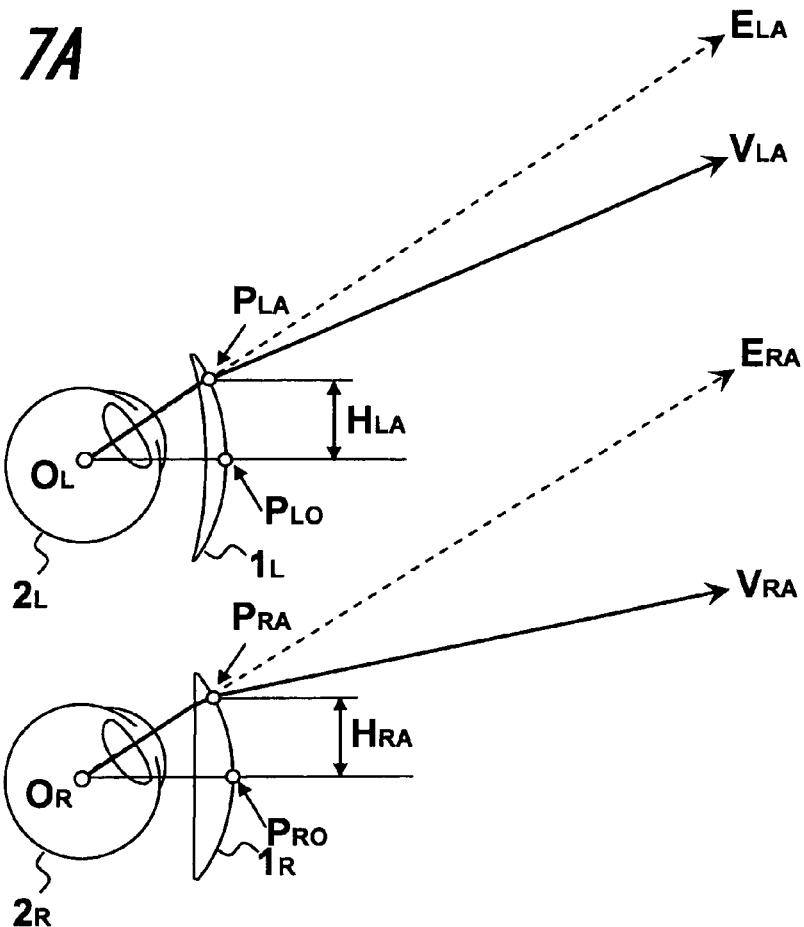
FIGS. 7A and 7B are explanatory drawings illustrating a difference in displacement of binocular vision in an upper visual field in progressive power lenses of plus dioptric power having different right and left dioptric powers.
Figure 7B:
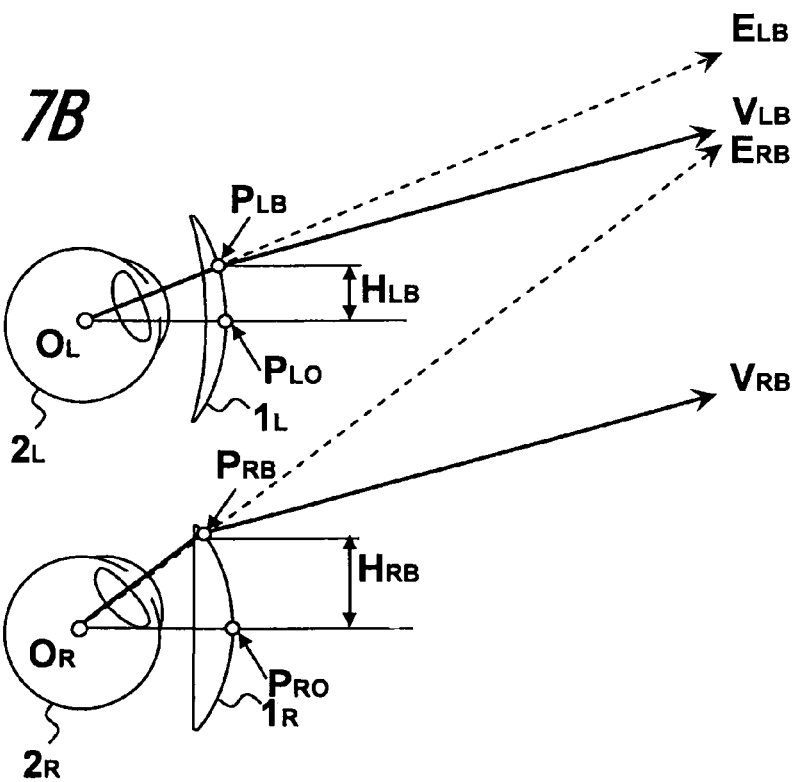

FIGS. 7A and 7B are diagrams illustrating eye axis directions and line-of-sight directions when a person who wears spectacles having distance dioptric power of the right eye more positive compared with the left eye looks upward with both eyes, and both of them are diagrams viewed from a side of the spectacle wearer. In a case where the spectacles of this wearer does not have negative distance dioptric power but has positive distance dioptric power, the situation becomes exactly opposite. The difference from FIG. 1B described above is that the eye axis directions (ELB and ERB) of the both eyes in FIG. 7B become vertically closer as they move away from the eyes.

Figure 8A:
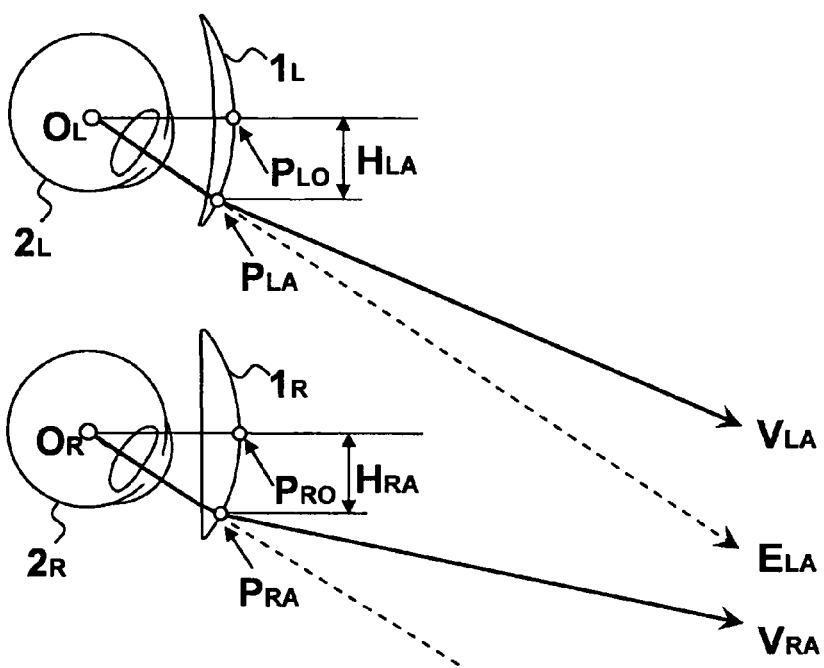
FIGS. 8A and 8B are explanatory drawings illustrating a difference in displacement of binocular vision in a lower visual field in progressive power lenses of plus dioptric power having different right and left dioptric powers.
Figure 8B:
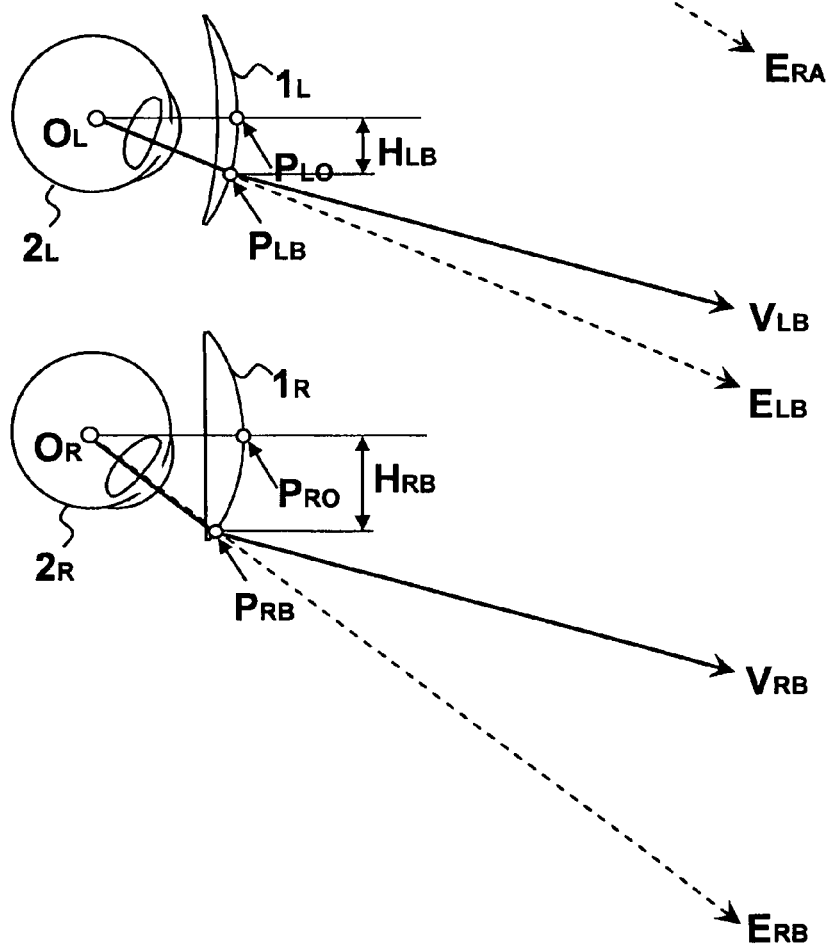

FIGS. 8A and 8B are diagrams illustrating eye axis directions and line-of-sight directions when a person who wears spectacles looks downward. The difference from FIG. 1B described above is that the eye axis directions (ELB and ERB) of the both eyes in FIG. 8B are vertically separated as they move away from the eyes.

As just described, in a case where a person who wears spectacles having different right and left distance dioptric powers looks upward and downward with both eyes, such inconvenience occurs that visual axes of the both eyes become closer or become separated vertically, or the things which do not occur if the right and left distance dioptric powers are the same are forced. In addition, since they change the positions on the lenses through which the lines of sight of the right and left eyes pass, the average dioptric power and astigmatism result in being changed at the passing positions of the lines of sight of the right and left eyes and it is found to be the impediments to binocular vision.

The present inventors have made ocular physiological considerations on binocular vision many times as described above, and they have reached a conclusion that these impediments to binocular vision can be improved by changing an average dioptric power distribution and an astigmatism distribution in a lens in advance so as to decrease a difference between a right and left distance dioptric power difference and an amount of changes in average dioptric power and astigmatism at passing positions of the lines of sight of right and left eyes by predicting the changes in the right and left passing positions of the lines of sight caused by the right and left distance dioptric power difference when all directions, such as distant vision, side vision, and intermediate vision, are viewed binocularly through progressive power lenses having different right and left distance dioptric powers.

That is, in wearing a pair of progressive power lenses having different right and left distance dioptric powers, changes in average dioptric power and astigmatism at passing positions of the lines of sight of the right and left eyes turn out to generate excessive differences other than the right and left distance dioptric power difference depending on the direction to be viewed binocularly, which becomes an impediment to binocular vision. Accordingly, although it is ideal to completely eliminate these excessive differences, even a decrease in these differences as compared in the past means that a reduction of impediments in binocular vision is realized and thus an effect of the present invention is produced.

In addition, the present invention is also applicable to all spectacle lenses including single-vision lenses having non-uniform lens power or aberration distribution, and it is found that the present invention is remarkably applicable to progressive power lenses in particular. Since an effective visual field of a spectacle lens is also influenced by the shape of a spectacle frame and a wear situation, an effect of the present invention can be achieved if a configuration of the present invention is carried out at least in a region within a diameter of 30 mm at the center of a spectacle lens. Specifically, a difference between the distance dioptric power difference and the difference between the average dioptric power and astigmatism relative to the right and left lines of sight in binocular vision can be defined as within 0.25 dioptres. Except for an extremely special case, 0.25 dioptres is a minimum pitch in an indication of dioptric power of spectacle lenses used among those skilled in the art and is considered to be a sufficiently small value that does not practically impede binocular vision as a limitation of a dioptric power difference between the both eyes.

Next, a description will be given to a pair of progressive power lenses in consideration of the binocular vision function and a method for designing the same in accordance with each embodiment.

[1] First Embodiment

First, a description will be given to Examples 1 to 3 as examples of not including cylindrical dioptric power in the distance dioptric power as a first embodiment of the present invention.

Table 1 is a list showing right and left distance dioptric powers and results of obtaining a ratio of amounts of displacement of lines of sight caused by the power difference thereof in Example 1 to Example 3 of the present invention.

The reference characters and indications in Table will be described. It should be noted that the reference characters shown in FIGS. 1B, 2B . . . and 8B illustrating situations in which a person who wears spectacles is actually forced to converge, diverge, or the like are used for the reference characters described below.

A reference character DL means left distance dioptric power (dioptre), a reference character DR means right distance dioptric power (dioptre), and a reference character DC means reference dioptric power (dioptre) as third dioptric power for not right nor left and makes use of average distance dioptric power (dioptre) for right and left here. A reference character OP is a distance (mm) from a center of rotation of eye to a central point of the front side of lens.

A reference character HLB means an amount of left eye displacement, which is a distance (mm) from a central point PLO of the front side of a left lens to an intersection PLB of the front side of lens with a line of sight of the left eye when viewing a distance other than the front with both eyes, and a reference character HRB means an amount of right eye displacement, which is a distance (mm) from a central point PR0 of the front side of a right lens to an intersection PRB of the front side of lens with a line of sight of the right eye when viewing a distance other than the front with both eyes. A reference character HC means an amount of reference displacement, which is a distance (mm) from a central point of the front side of a lens having reference dioptric power to an intersection of the front side of lens with a line of sight of the left eye or the right eye when viewing a distance other than the front with both eyes. It should be noted that the "central point of the front side of lens" in this context is an intersection of a line of sight viewing a front distance with the front side of lens, which is also an optical centre point of the lens.

An expression HLB/HRB is a ratio of the amount of left eye displacement relative to the amount of right eye displacement (direct adjustment ratio for the left eye), an expression HRB/HLB is a ratio of the amount of right eye displacement relative to the amount of left eye displacement (direct adjustment ratio for the right eye), an expression HLB/HC is a ratio of the amount of left eye displacement relative to the amount of reference displacement (adjustment ratio for the left eye), and an expression HRB/HC is a ratio of the amount of right eye displacement relative to the amount of reference displacement (adjustment ratio for the right eye).

Here, since all of the amount HLB of left eye displacement, the amount HRB of right eye displacement, and the amount HC of reference displacement denote an amount of disposition of a line of sight on a lens from frontal distant vision when viewing a distance in an arbitrary direction other than the front with both eyes, they do not become a specific value, whereas ratios to one another between them can be calculated by using the left distance dioptric power DL, the right distance dioptric power DR, the reference dioptric power DC, and the distance OP from the center of rotation of eye to the central point of the front side of lens in Table 1.

As described above, in the first embodiment, since distance dioptric power of the progressive power lenses does not include cylindrical dioptric power, but includes spherical dioptric power, the four types of adjustment ratios do not have orientation and become respective eigenvalues for all azimuthal angles. For this reason, the mutual ratios between the amount HLB of left eye displacement, the amount HRB of right eye displacement, and the amount HC of reference displacement in an arbitrary direction may be defined as respective adjustment ratios.

In Table 1, although it is generally known that the distance between the center of rotation of eye and the central point of the front side of lens is often longer with myopic eyes and shorter with hyperopic eyes, the distance is treated to be regarded as being almost the same for right and left lenses in order to facilitate the description here. Accordingly, on the assumption that the distance from the center of rotation of eye OL of the left eye to the central point PL0 of the front side of the left lens and the distance from the center of rotation of eye OR of the right eye to the central point PR0 of the front side of the right lens are the same, this distance is shown as the distance OP from the center of rotation of eye to the central point of the front side of lens. It should be noted that, in a case where the heights of the central points of front sides of the right and left lenses are different, this distance becomes a different value. This is treated similarly herein in Table 2 described in a second embodiment in a case of astigma described later.

In addition, the reference lenses having reference dioptric power DC are lenses having third dioptric power (reference dioptric power) not for right nor for left as described above, and they mean virtual lenses to be reference in the modification of the design of the right and left lenses as described later.

TABLE 1

| Example Number | | 1 | 2 | 3 |
|---|---|---|---|---|
| Left Distance Dioptric Power | DL[D] | −3.00 | −1.00 | +3.00 |
| Right Distance Dioptric Power | DR[D] | −6.00 | −3.00 | +4.00 |
| Reference Distance Dioptric Power | DC[D] | −4.50 | −2.00 | +3.50 |
| Centre Distance | OP[mm] | 30.0 | 30.0 | 30.0 |
| Direct Adjustment Ratio for Left Eye | HLB/HRB | 108.3% | 105.8% | 96.7% |
| Direct Adjustment Ratio for Right Eye | HRB/HLB | 92.4% | 94.5% | 103.4% |
| Adjustment Ratio for Left Eye | HLB/HC | 104.1% | 102.9% | 98.4% |
| Adjustment Ratio for Right Eye | HRB/HC | 96.2% | 97.2% | 101.7% |

(1) EXAMPLE 1

As shown in Table 1, Example 1 is progressive power lenses having distance dioptric power for the right eye with more minus dioptric power compared with the left eye.

FIG. 1B is a diagram of a situation where a person who wears the pair of progressive power lenses of Example 1 views a side on the right in the distance with both eyes, viewed from overhead of the wearer.

The situation is as described above, and a state is illustrated in which the wearer viewing a distance is forced to converge in spite of not being accompanied by accommodation strain.

Here, a description will be given to a method for calculating the "adjustment ratios" required to correct the design (average dioptric power distribution and astigmatism distribution) of the progressive power lenses in conventional techniques according to the present invention.

A method is shown as an example in which a relational expression of the amount HLB of left eye displacement and the amount HRB of right eye displacement in FIG. 1B is obtained to make ratios to one another between them to be the "adjustment ratios".

First, respective prismatic powers (PrismL and PrismR) at points (PLB and PRB) on the right and left lenses in FIG. 1B are obtained, by using Plantis Formula $P = H*D/10$ (P: prismatic power (prism dioptre), H: amount (mm) of displacement from optical centre point, D: lens dioptric power (D)), as follows:

$\text{Prism}L = HLB \times DL/10$ (prism dioptre)

$\text{Prism}R = HRB \times DR/10$ (prism dioptre).

Gradient of a deflection angle of the line of sight due to each prismatic power is equal to $1/100$ of each prismatic power from the definition (deflected by Prism [cm] at a position separated by 1 m) of the prismatic power.

In addition, as apparent from FIG. 1B, the deflection angle due to the prismatic power (PrismL and PrismR) at line-of-sight passing points (points PLB and PRB) on the right and left lenses is equal to an angle between the left eye axis direction ELB and the left line-of-sight direction VLB in a case of the left eye. This also applies to the right eye.

Further, the gradients of the right and left eye axis directions (ELB and ERB) are, when represented by using the distance OP from the center of rotation of eye to the central points (PL0 and PR0) of optical centers of the lenses (front side), a quotient of the amount of left eye displacement divided by the distance (HLB/OP) for the left eye and a quotient of the amount of right eye displacement divided by the distance (HRB/OP) for the right eye.

From above description, the gradient of the left line-of-sight direction VLB and the gradient of the right line-of-sight direction VLB are as follows:

Gradient of left line-of-sight direction $VLB$=Gradient of left eye axis direction $ELB$+Gradient of angle between left eye axis direction $ELB$ and left line-of-sight direction $VLB$=$HLB/OP$−$HLB$×$DL$/1000 \hfill (a)

Gradient of right line-of-sight direction $VRB$=Gradient of right eye axis direction $ERB$+Gradient of angle between right eye axis direction $ERB$ and right line-of-sight direction $VLB$=$HRB/OP$−$HRB$×$DR$/1000 \hfill (b).

Then, since the left line-of-sight direction VLB and the right line-of-sight direction VRB are in parallel, from the above expression (a)=the expression (b), the following expression applies:

$HLB$ (1/$OP$−$DL$/1000)=$HRB$ (1/$OP$−$DR$/1000), and the ratio (direct adjustment ratio for the left eye) of the amount of left eye displacement relative to the amount of right eye displacement becomes $$HLB/HRB = (1/OP - DR/1000)/(1/OP - DL/1000) \quad (1)$$
$$= (1000 - OP \times DR)/(1000 - OP \times DL),$$

and the ratio (direct adjustment ratio for the right eye) of the amount of right eye displacement relative to the amount of left eye displacement becomes $$HRB/HLB = (1/OP - DL/1000)/(1/OP - DR/1000) \quad (2)$$
$$= (1000 - OP \times DL)/(1000 - OP \times DR).$$

From these expressions (1) and (2), the direct adjustment ratio for the left eye HLB/HRB and the direct adjustment ratio for the right eye HRB/HLB can be obtained.

Case examples calculated by using these expression (1) and expression (2) are Example 1 to Example 3, and as shown in Table 1, the direct adjustment ratio HLB/HRB for the left eye is calculated as 108.3% and the direct adjustment ratio HRB/HLB for the right eye as 92.4% in Example 1, for example.

This can be used effectively for a method for adjusting a monocular lens, in which one of the lenses for the left eye and the right eye is adjusted to the other of the lenses, as a method for adjusting a binocular vision function in design.

In addition, this can also be used in examples of a dominant eye and the like, and further this is also useful in a case of adding other conditional data with this as basic data.

For example, when one of the eyes is a strong "dominant eye" or there is a big difference in the visual acuity of the both eyes, it is considered that a difference occurs in the amounts of correction in the right and left eye axis directions. For example, when the right eye is a strong "dominant eye" or the visual acuity of the right eye is considerably better than that of the left eye, the amount of correction in the eye axis direction is supposed to be smaller in the right eye than in the left eye. Except such a special case, it is considered that correction is normally performed in such a manner that the both eyes meet halfway with each other. Although the amounts of correction in the both eyes are regarded to be equal herein in order to simplify the description, the present invention is, of course, not limited to that.

Besides, since a prismatic action does not occur relative to the right and left lines of sight in frontal distant vision regardless of the dioptric power of the lens, the impediment to binocular vision itself does not exist.

Next, a description will be given to the point that optical situations at line-of-sight passing points (point PLB and point PRB) on the right and left lenses through which the lines of sight of the both eyes pass conform to each other, particularly the average dioptric power distributions and the astigmatism distributions in the present Example. In this regard, since the right and left distance dioptric powers are different from each other as prescribed dioptric power values, the dioptric power difference thereof has to be maintained.

A specific method in such lens design will be described.

Figure 9:
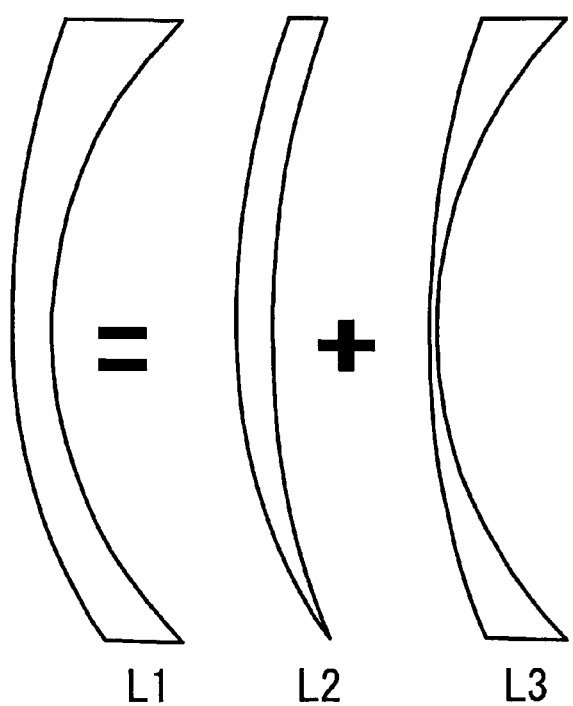
FIG. 9 is a side view illustrating a configuration of a progressive power lens.

In the present Example, as shown in FIG. 9, when one piece of a progressive power lens L1 is supposed to be an overlap of a lens L2, formed of a plano progressive power lens which is equivalent to the progressive power lens L1 except having distance dioptric power of zero, and a lens L3, formed of a single-vision lens having the distance dioptric power of the progressive power lens L1, the average dioptric power distribution and the astigmatism distribution at the points (PLB and PRB) on the right and left lenses of the right and left plano progressive power lens components (elements), that is, the lens component (element) of the lens L2 as the plano progressive power lens in FIG. 9 are adjusted.

However, modes of the present invention are not limited only to the plano progressive power lens as the lens L2 in FIG. 9 in which the distance dioptric power is zero. For example, it is also possible to employ an average dioptric power of the right and left distance dioptric powers and a reference dioptric power as the distance dioptric power of the lens L2. An advantage in this case is remarkable in a case, for example, where the present invention is applied to a pair of progressive power lenses having strong dioptric power. This is because design including an aspherical surface element can be carried out in designing the lens component (element) of the lens L2, which is one step of the present invention, to reduce the occurrence of a variety of aberrations caused by not being able to orthogonalize the line of sight and the lens surface, which often become a problem in strong dioptric power. In this case, the absolute value of the dioptric power of the single-vision lens, which corresponds to the lens L3, becomes smaller than in the case where the distance dioptric power of the lens L2 is zero, and thus optical errors due to the overlap of the lens L2 and the lens L3 can be minimized.

It should be noted that, here, the term astigmatism distribution is used in the meaning including a distribution in an axial direction of astigmatism as well.

For example, in FIG. 1B, when the addition powers of the right and left progressive power lenses (1L and 1R) are equal and the distance dioptric powers are different, it can be considered that, in a case where these lenses are the progressive power lenses of conventional design, the right and left plano progressive power lens components (corresponding to the lens L2 in FIG. 9) are designed (average dioptric power distribution and astigmatism distribution) in mirror symmetry so as to be reflected in a mirror. However, since the right and left single-vision lens components (equivalent to the lens L3 in FIG. 9) having distance dioptric power are different from each other, the amount HLB of left eye displacement and the amount HRB of right eye displacement turn out to be different for the reasons described above. As a result, the average dioptric power and the astigmatism become different at the line-of-sight passing points (point PLB and point PRB) of the both eyes to thereby impede good binocular vision.

An improvement in this inconvenience can be achieved by modifying the design of either or both of the right and left plano progressive power lens components (equivalent to the lens L2 in FIG. 9) so as to equalize the average dioptric power and the astigmatism at the line-of-sight passing points (point PLB and point PRB) of the both eyes.

In a case of modifying only the design of the left lens when the amount HLB of left eye displacement is larger than the amount HRB of right eye displacement as in FIG. 1B, it is only necessary that the average dioptric power distribution and the astigmatism distribution for the left plano progressive power lens are dispersed (or enlarged) on the entire lens by the direct adjustment ratio for the left eye (HLB/HRB). The dispersion in this case is used in the meaning of such a change that contour lines of the average dioptric power and contour lines of the astigmatism maintains similar shapes while being enlarged.

On the contrary, in a case of modifying only the design of the right lens, this ratio becomes the inverse number thereof, and it is only necessary that the average dioptric power distribution and the astigmatism distribution for the right plano progressive power lens are concentrated (or reduced) by the direct adjustment ratio for the right eye (HRB/HLB). The concentration in this case is an expression opposite to the dispersion and is used in the meaning of such a change that the contour lines of the average dioptric power and the contour lines of the astigmatism maintains similar shapes while being reduced.

That is, since the present invention makes use of a method for changing the distribution in astigmatism, the distribution in an axial direction, the distribution in an average dioptric power, and the like of the right and left plano progressive power lenses relative to the lines of sight of the both eyes in a direction of conforming while keeping the difference in the distance dioptric power when a person who wears progressive power lenses having different right and left distance dioptric powers views all directions of right-to-left and up-and-down with both eyes by carrying out modification in design to correct the average dioptric power distribution and the astigmatism distribution of each of the right and left plano progressive power lens components by using an appropriate ratio for correction, the occurrence of an excessive difference other than the right and left distance dioptric power difference is suppressed.

Here, the difference of the positions (PLB and PRB) of the points on the right and left lenses in FIG. 1B directly means a difference in magnitude of respective amounts of displacement (HLB and HRB) of the right and left eyes.

Accordingly, in a case of not modifying the progressive power lens for the right eye and modifying only the progressive power lens for the left eye for example, if the average dioptric power distribution and the astigmatism distribution of the plano progressive power lens components of the progressive power lens for the left eye are enlarged relative to the average dioptric power distribution and the astigmatism distribution of the plano progressive power lens components of the progressive power lens for the right eye while maintaining a homothetic shape by using a conversion ratio (in Example 1, 108.3% of the direct adjustment ratio for the left eye HLB/HRB in Table 1), the astigmatisms, the axial directions, the average dioptric powers, and the like at the positions (PL and PR) of the right and left plano progressive power lenses become the same, and the optical situations relative to the lines of sight of the both eyes conform to each other, so that the object of the present invention can be achieved.

On the contrary, in a case of not modifying the progressive power lens for the left eye and modifying only the progressive power lens for the right eye, it is only necessary that with reference to the progressive power lens for the left eye, the average dioptric power distribution and the astigmatism distribution of the plano progressive power lens components of the progressive power lens for the right eye are reduced while maintaining a homothetic shape by using a conversion ratio (in Example 1, 92.4% of the direct adjustment ratio for the right eye HRB/HLB in Table However, it is considered that gradual modification in the lenses for the both eyes, rather than large modification only in the lens for a single eye, is more natural and advantageous in the sense of balancing both eyes. In addition, also in such a case of changing from the progressive power lenses according to a conventional technique to the progressive power lenses of the present invention, a feeling of discomfort at the initial stage accompanied by the change is considered smaller in gradual modification in the lenses for the both eyes rather than large modification only in the lens for a single eye.

Such gradual modification in the lenses for the both eyes means to correct the design of the right and left progressive power lenses in opposite directions so as to become closer to each other. That is, the reference distance dioptric power in a case of modifying only a lens for a single eye has been previously a distance dioptric power of the other eye. Accordingly, when the dioptric power positioned between the right and left distance dioptric powers is defined as a reference distance dioptric power which is common to right and left distance dioptric powers, the design of the right and left progressive power lenses can be corrected in an opposite direction so as to become closer to each other with reference to the reference distance dioptric power. It should be noted that the "dioptric power positioned between the right and left distance dioptric powers" in this context is not always limited to the average dioptric power of the right and left dioptric powers, and it is also possible to employ reference distance dioptric power close to either right or left dioptric power due to various factors, such as the side of the dominant eye, the side of stronger dioptric power, and the side with cylindrical dioptric power. As the most extreme example, a case where either right or left dioptric power is defined as the reference distance dioptric power corresponds to the case of modifying only the lens for a single eye described above.

The reference distance dioptric power DC in Table 1 mentioned above is what shows them specifically, and the amount HC of reference displacement includes amounts of displacement from the optical centre points (PL0 and PR0) of the right and left lenses corresponding thereto.

It should be noted that, although the points (PL0 and PR0) are set as optical centre points here, the present invention can also be carried out even when a prism having same right and left amounts and same right and left directions for the reduction of thickness and the like, called prism thinning, is provided. The points (PL0 and PR0) in that case are not optical centre points but are prism reference points. T he reference distance dioptric power DC is a third dioptric power between the right and left distance dioptric powers (DL and DR), and employs average power of the right and left distance dioptric powers in Table 1 mentioned above.

Then, if either the progressive power lens for the right eye or the progressive power lens for the left eye is subjected to design modification (modification of the average dioptric power distribution and the astigmatism distribution) to adapt the optical performance on the assumption of a virtual progressive power lens (third progressive power lens) having distance dioptric power of this reference distance dioptric power DC, a pair of progressive power lenses of the present invention in consideration of the binocular vision function is obtained.

In this regard, the virtual progressive power lens having the reference distance dioptric power is not necessarily required to be designed actually as a progressive power lens, and the present invention can be realized only by using the distance dioptric power as a factor merely to obtain the adjustment ratio for the left eye and the adjustment ratio for the right eye shown in Table 1.

The ratios of the amount HLB of left eye displacement and the amount HRB of right eye displacement relative to this amount HC of reference displacement are represented in the same way as the cases of the direct adjustment ratio for the left eye HLB/HRB, direct adjustment ratio for the right eye HRB/HLB, and the like, by Ratio of the amount of left eye displacement relative to amount of reference displacement (adjustment ratio for the left eye):

$$HLB/HC = (1/OP - DC/1000)/(1/OP - DL/1000) \quad (3)$$
$$= (1000 - OP \times DC)/(1000 - OP \times DL).$$

and

Ratio of the amount of right eye displacement relative to amount of reference displacement (adjustment ratio for the right eye):

$$HRB/HC = (1/OP - DC/1000)/(1/OP - DR/1000) \quad (4)$$
$$= (1000 - OP \times DC)/(1000 - OP \times DR).$$

From these expressions (3) and (4), the adjustment ratio for the left eye HLB/HC and the adjustment ratio for the right eye HRB/HC can be obtained.

The Example is as shown in Table 1, and the adjustment ratio for the left eye HLB/HC and the adjustment ratio for the right eye HRB/HC are respectively 104.1% and 96.2%.

Next, the average dioptric power distribution and the astigmatism distribution of the plano progressive power lens components of the progressive power lens of the reference dioptric power DC are enlarged in a homothetic shape by using a conversion ratio (in Example 1, 104.1% of HLB/HC ratio in Table 1) to obtain the average dioptric power distribution and the astigmatism distribution of the plano progressive power lens components of the progressive power lens for the left eye, and a single-vision lens of a distance dioptric power DL component for the left eye is further overlapped (optically added) to obtain a progressive power lens for the left eye of Example 1.

Similarly, the average dioptric power distribution and the astigmatism distribution of the plano progressive power lens components of the progressive power lens of the reference dioptric power DC are reduced in a homothetic shape by using a conversion ratio (in Example 1, 96.2% of HRB/HC ratio in Table 1) to obtain the average dioptric power distribution and the astigmatism distribution of the plano progressive power component lens components of the progressive power lens for the right eye, and a single-vision lens of a distance dioptric power component for the right eye is further overlapped (optically added) to obtain a progressive power lens for the right eye of Example 1.

As just described, in a case of modifying the average dioptric power distribution and the astigmatism distribution of the progressive power lenses in response to the right and left eyes, the great change described above in a case of modifying the average dioptric power distribution and the astigmatism distribution of the progressive power lens only for a single eye is divided into the both eyes. Accordingly, there may be only a smaller change in each of the right and left eyes.

Figure 10:
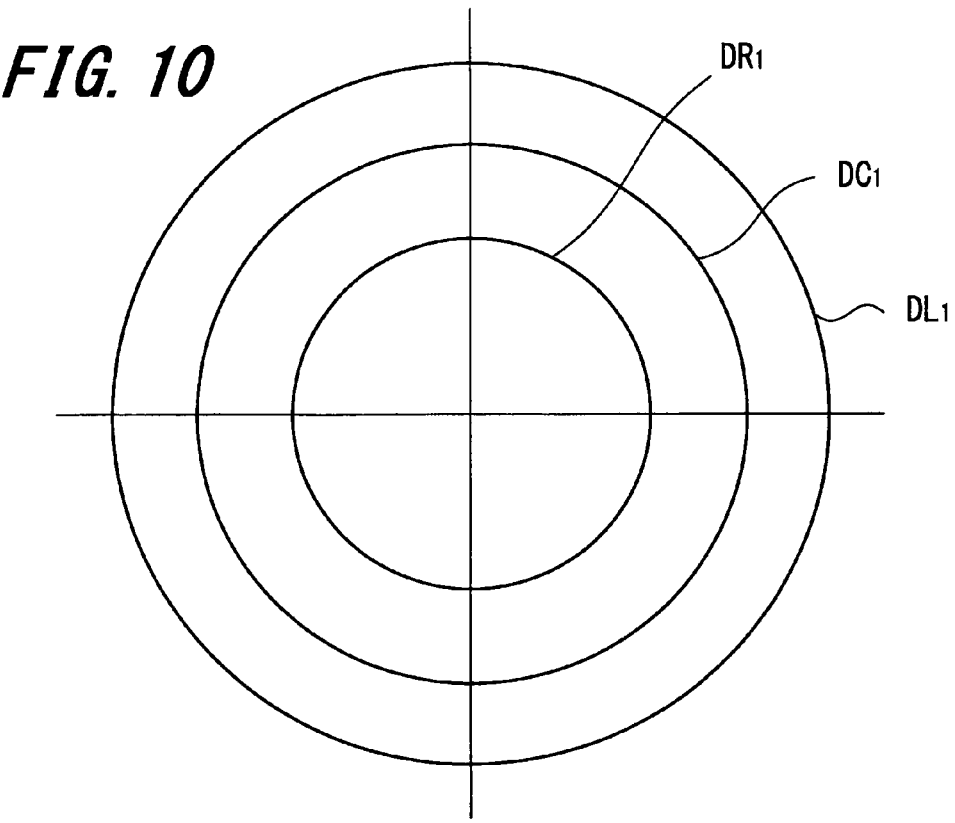
FIG. 10 is an explanatory drawing illustrating a difference in magnitude of distance dioptric power of progressive power lenses in Example 1 of the present invention, as a ratio likened to a circle.

FIG. 10 is an explanatory drawing illustrating magnitude of the lens dioptric power as ratios likened to three circles as a method for describing the homothetic enlargement and reduction in shapes.

The magnitude of the dioptric powers (DL1 and DR1) of the right and left lenses and the dioptric power of reference dioptric power DC1 in Example 1 is represented, and a stronger minus dioptric power shows a smaller circle. When comparing the size of these circles, the left eye lens circle ratio (DL1/DC1) is larger than 1, which represents an enlargement, and the right eye lens circle ratio (DR1/DC1) is smaller than 1, which represents a reduction.

Besides, a description will be given below to a specific method for design modification (modification of the average dioptric power distribution and the astigmatism distribution) of Example 1 for homothetic enlargement and reduction in shapes.

A first method, which is simplest, is designing by using parameters based on new coordinate values obtained by multiplying the adjustment ratios by the XY coordinate values (coordinate values horizontal and vertical towards the lens surface; a design centre is the origin) of all parameters (a starting position and a terminal position of the progressive corridor, distant and near dioptric power measurement positions, a width of a near region, and the like) related to the length and the width in a case of designing from the prescribed dioptric power (or a wear state, as needed) on the basis of a design specification for the progressive power lenses by a conventional technique. It should be noted that the parameters in this case are not only variable parameters but also include fixed parameters, which are normally at fixed values. As just described, by enlarging and reducing all the parameters related to the length and the width, the distributions of the average dioptric power and the astigmatism, which are the results of design, are also enlarged and reduced at an equal ratio. This allows obtaining a progressive surface (or an aspherical surface having the progressive element) having an average dioptric power distribution and an astigmatism distribution in response to the adjustment ratios.

In addition, the design and correction can also be carried out by using a second method, not being accompanied by modification of design parameters related to the length and the width, as below.

In the second method, first, in a case of designing from the prescribed dioptric power (or a wear state, as needed) on the basis of a design specification for the progressive power lenses by using a conventional technique, a progressive surface (or a surface having a progressive element) is designed, which makes use of a reference curve (base curve) and addition power (or an element of the addition power) of a lens that are products of a reference curve (base curve) and addition power (or an element of the addition power) of the lens multiplied by the adjustment ratios separately set for right and left lenses. Such design is performed on the front side or back side of the lens, or both, as needed.

The progressive surface (or a surface having a progressive element) is calculated as coordinate value data in a three dimensional direction of (x, y, z). Then, a progressive surface (or a surface having progressive elements) represented by coordinate values obtained by multiplying the adjustment ratios by each value of the coordinate values (x, y, z) becomes the intended design surface in the present invention.

Normally, coordinate points to be used are at least 8000 points or more in a monocular lens.

It should be noted that the inset processing corresponding to the convergence action in near vision is carried out, in the first method and the second method above, in a design step according to a conventional technique.

That is, the technique of the present invention is effective for the improvement of the inconvenience resulted from the right and left distance dioptric power difference, and does not include a function of the inset processing for near vision.

However, since an inset processing by the second method, for example, is carried out at identical right and left distance dioptric powers such as reference dioptric power, the amounts of right and left insets become equal at the stage of terminating conventional design.

After that, dispersion and concentration are carried out at the respective right and left adjustment ratios, and subsequently single-vision lens components are added, which are equivalent to the right and left dioptric power difference, thereby being finally corrected to be amounts of inset different between right and left lenses, which allows near vision corresponding to the right and left dioptric power difference.

The basic concept of the second method described here is an enlargement and a reduction of the entire design surface. For example, since a second design surface of three dimensional coordinate value data (Hx, Hy, Hz) obtained by multiplying all of certain three dimensional coordinate value data (x, y, z) of a first design surface by H is a design surface obtained by spatially multiplying the first design surface by H, the average dioptric power distribution and the astigmatism distribution can also be considered to be multiplied by H. Here, it means enlargement (dispersion) when H is larger than 1 (or 100%) and reduction (concentration) when smaller.

In this regard, since even the curvature radius of the reference curve (base curve) of the design surface turns out to be changed by being multiplied by H (multiplied by 1/H for the curvature and the curve), it is inconvenient to use this method only. In order to prevent this inconvenience, if the reference curve (base curve) of the design surface to be designed is designed to be multiplied by H (multiplied by 1/H for the curvature radius) in advance, it returns to the initial reference curve (base curve) at the stage of multiplying all of the three dimensional coordinate value data (x, y, z) by H. This applies to the addition power (or an element of the addition power), and the reference curve of the design surface is multiplied by H in advance in order to prevent the curvature radius at distant and near dioptric power measurement positions from being multiplied by H to make the curve difference to be 1/H.

This enables not to change the value of the base curve and the addition power (or an element of the addition power), even when modifying the aberration and the average dioptric power distribution, to thereby maintain the prescribed dioptric power.

It should be noted that the terms, such as the "surface having a progressive element" and the "element of the addition power", are the names of design elements used when designing integrated-double surface progressive power lenses described later.

By employing the design approach described above, in each state illustrated in the B series of drawings from FIGS. 1A to 8B described above (FIG. 1B to FIG. 8B), the astigmatisms, the axial directions, the average dioptric powers, and the like at the right and left points (PLB and PRB) of the respective plano progressive power lenses become the same, and the optical situations relative to the lines of sight of the both eyes can conform to each other.

It should be noted that the region of the three dimensional coordinate data on the design surface becomes wider or narrower accompanied by the design processing of enlargement and reduction mentioned above, and since the data region required for manufacturing a lens with a predetermined outer diameter has to be satisfied, it is necessary to set a wider data region in advance particularly in a case of carrying out design processing for reduction.

In the description below, to "carry out dispersion or concentration" means also including an operation of multiplying such a base curve and addition power (or an element of the addition power) by the ratio of dispersion or concentration in advance.

In addition, designing the present invention along with a design approach, such as an optimization calculation processing using a ray tracing method normally used in designing progressive power lenses for improving optical aberration and convergence calculation further in consideration of a wear state, leads to the improvement in the accuracy and the increase in the degree of perfection of design and is an effective means.

That is, as described above, although the design modification (modification of the average dioptric power distribution and the astigmatism distribution) of the progressive power lenses in the present Example 1 is, first, carried out in a method for homothetic enlargement, reduction, or the like in shapes of the plano progressive power lenses, and after that, a single-vision lens is optically added, it is also possible to improve the accuracy, when determining a final lens shape, by so-called convergence calculation, in which strict ray tracing is carried out in consideration of wear states, such as three dimensional positional relationship of the distance and the angle between the lens and the eye, and further the objective distance (distance from the eye to the visual target), and after comprehending an error in the object of the present invention, recalculation (redesign) for canceling the error is repeated.

(2) EXAMPLE 2

Example 2 is an example using a design approach similar to Example 1, in which the progressive power lens for the right eye has a stronger minus dioptric power than that for the left eye.

(3) EXAMPLE 3

Example 3 is also an example using a design approach similar to Example 1 described above, in which the progressive power lens for the right eye has a stronger plus dioptric power than that for the left eye.

Figure 11:
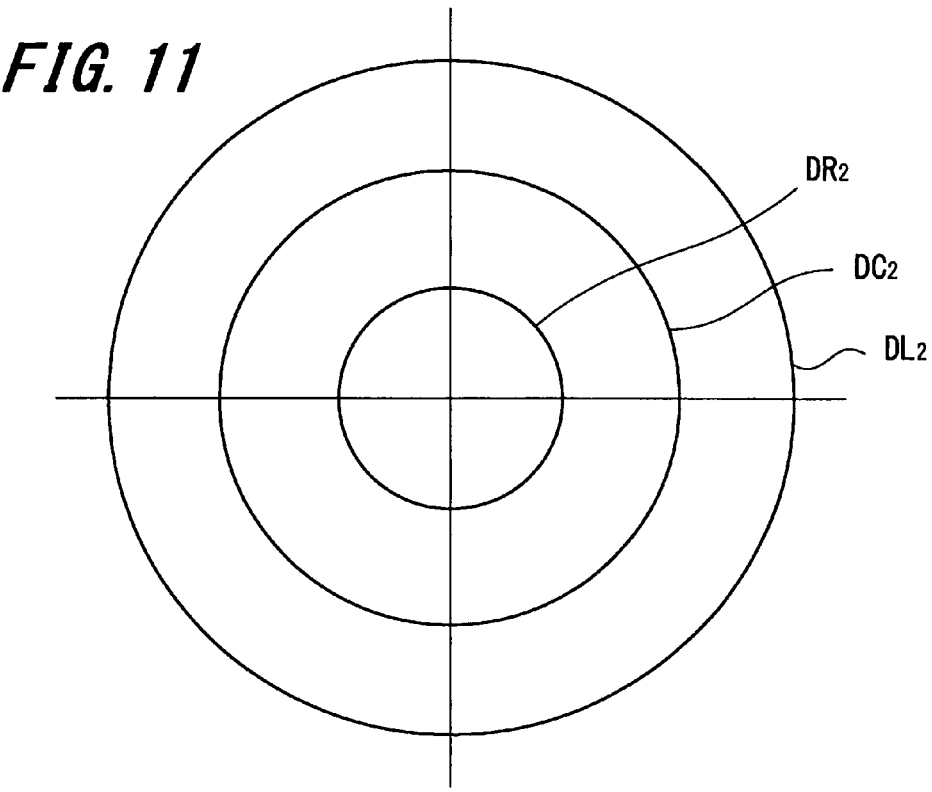
FIG. 11 is an explanatory drawing illustrating a difference in magnitude of distance dioptric power of progressive power lenses in Example 2 of the present invention, as a ratio likened to a circle.
Figure 12:
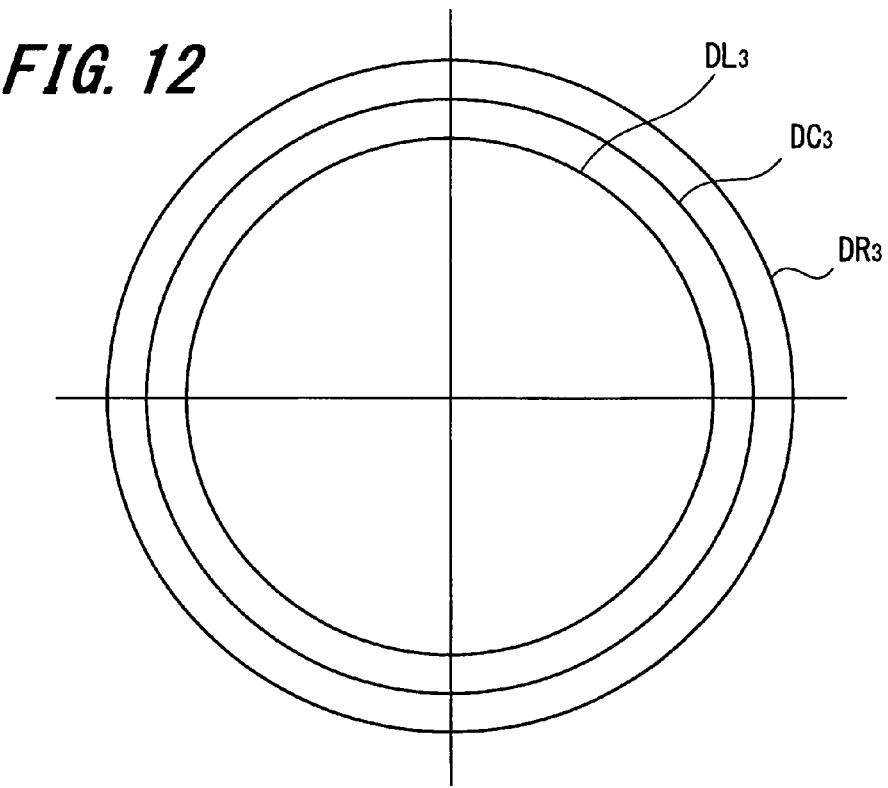
FIG. 12 is an explanatory drawing illustrating a difference in magnitude of distance dioptric power of progressive power lenses in Example 3 of the present invention, as a ratio likened to a circle.

FIG. 11 and FIG. 12 are explanatory drawings illustrating magnitude of the lens dioptric power as ratios likened to three circles similar to FIG. 10, and circles DL2 and DL3 respectively denote the left lens dioptric power, circles DR2 and DR3 denote the right lens dioptric power, and circles DC2 and DC3 respectively denote the reference dioptric power.

Similar to Example 1, both in Example 2 and Example 3, the direct adjustment ratio for the left eye HLB/HRB, the direct adjustment ratio for the right eye HRB/HLB, the adjustment ratio for the left eye HLB/HC, and the adjustment ratio for the right eye HRB/HC obtained from the expressions (1) through (4) are shown as the design data in Table 1 in parallel with Example 1.

Since the basic design approaches are the same as in Example 1 only with different ratios of enlargement and reduction, the descriptions for them are omitted.

It should be noted that, as is shown from Table 1, although the left distance dioptric power in Example 1 and the right distance dioptric power in Example 2 are the same value of −3.00 [D], the values of the direct adjustment ratio for the left eye and the adjustment ratio for the left eye in Example 1 are naturally different from the values of the direct adjustment ratio for the right eye and the adjustment ratio for the right eye in Example 2. It goes without saying that this is due to the fact that the distance dioptric power of the other eye is different in Example 1 as being −6.00 [D] and in Example 2 as being −1.00 [D].

That is to say, when comparing with a pair of progressive power lenses having the same right and left distance dioptric power of −3.00 [D], for example, it is understood that even if the other conditions such as the addition power are the same, in a case of applying the designing method of the present invention, the average dioptric power distribution and the astigmatism distribution of the lens having only one eye distance dioptric power of −3.00 [D] become different from the average dioptric power distribution and the astigmatism distribution of the progressive power lenses having the same right and left distance dioptric power mentioned above.

[2] Second Embodiment

Next, a description is given to a case of including cylindrical dioptric power in the distance dioptric power as a second embodiment of the present invention.

Table 2 is a list showing lens data related to Example 4 to Example 7 carried out on the basis of a designing method of the present invention. The largest difference from Example 1 to Example 3 is that the distance dioptric power includes information of the cylindrical dioptric power and the astigmatic axial direction.

The reference characters shown in Table 2 will be described.

DL-Sph is distance spherical dioptric power for the left (dioptre), DL-Cyl is distance cylindrical dioptric power for the left (dioptre), DL-AX is a distance astigmatic axial direction for the left (°), and a lens indicated by the left distance dioptric power DL is a DL lens. Then, the right eye lens corresponding to this uses expressions by modifying L in the expressions mentioned above to R, and a lens indicated by the right distance dioptric power DR is a DR lens.

DC-Sph is distance spherical dioptric power (dioptre) of the reference dioptric power (here, average dioptric power of right and left), DC-Cyl is distance cylindrical dioptric power (dioptre) of the reference dioptric power (here, average dioptric power of right and left), and DC-AX is a distance astigmatic axial direction (°) of the reference dioptric power (average dioptric power of right and left).

EL-Sph is distance spherical dioptric power (dioptre) of an EL lens (differential lens for the left) described later, EL-Cyl is distance cylindrical dioptric power (dioptre) of the EL lens, and EL-AX is a distance astigmatic axial direction (°) of the EL lens.

The lens and the expressions for the right eye corresponding to these are also the same.

OP denotes a distance (mm) from a center of rotation of eye to a central point of the front side of lens.

The lens represented by DC— is equivalent to the lens having the reference dioptric power (DC lens) described in the first embodiment and is a lens having third dioptric power (reference dioptric power), which is not for the right nor the left as described above, and is a virtual lens to be a criterion for modification of the design of the right and left lenses described later. In addition, the difference from the DC lens in the first embodiment is to include information of the cylindrical dioptric power and the astigmatic axial direction.

In the description of the DC lens of the reference dioptric power, the "average dioptric power of right and left" selected as the reference dioptric power include lens dioptric power with half of synthesis dioptric power obtained by overlapping the left eye DL lens and the right eye DR lens, and is not an additive average value of right and left spherical dioptric powers or cylindrical dioptric powers.

The EL lens described above is a virtual differential lens for the left being a difference obtained by optically subtracting the reference dioptric power DC lens from the left eye DL lens. Similarly, the ER lens is defined a virtual differential lens for the right being a difference obtained by optically subtracting the reference dioptric power DC lens from the right eye DL lens.

Besides, a method for calculating synthesis dioptric power of two pieces of lenses including cylindrical dioptric power is described in, for example, "Optical Technique Handbook (1968, published by Asakura Publishing Co., Ltd.)" on the page 800 to page 802. The lens dioptric power with half of this synthesis dioptric power is obtained by making the spherical dioptric power and the cylindrical dioptric power to be ½ without modifying the astigmatic axial direction of the synthesis dioptric power. In addition, the deviation of the two pieces of lenses is obtained by adding (synthesizing) the spherical dioptric power and the cylindrical dioptric power of the subtracting lens, with the sign reversed (from plus to minus, and from minus to plus), to the lens to be subtracted, without modifying the astigmatic axial direction.

In addition, although HLELb and HLELc are equivalent to the amount HLB of left eye displacement in the first embodiment, in order to cope with the cylindrical dioptric power in the second embodiment, it is divided into two components of a base direction and a cross direction of the EL lens (differential lens for the left) and they are expressed so as to be distinguished respectively as an amount HLELb of left eye displacement in the base direction and an amount HLELc of left eye displacement in a cross direction.

Similarly, an amount HRERb of right eye displacement in the base direction and an amount HRERc of right eye displacement in the cross direction are equivalent to the amount HRB of right eye displacement in the first embodiment. Similarly, an amount HCELb of left eye reference displacement in the base direction, an amount HCELc of left eye reference displacement in the cross direction, an amount HCERb of right eye reference displacement in the base direction, and an amount HCERc of right eye reference displacement in the cross direction are equivalent to the amount of reference displacement, and they exist as many as four types in total because it is necessary to cope with each of the base direction and the cross direction for both the EL lens and the ER lens.

That is to say, in a case of including cylindrical dioptric power in the distance dioptric power of the left eye or the right eye as in the second embodiment, the base direction and the cross direction of the differential lens for the left (EL lens) and the base direction and the cross direction of the differential lens for the right (ER lens) are used as a predetermined direction to calculate the ratios of the amounts of displacement.

Figure 13:
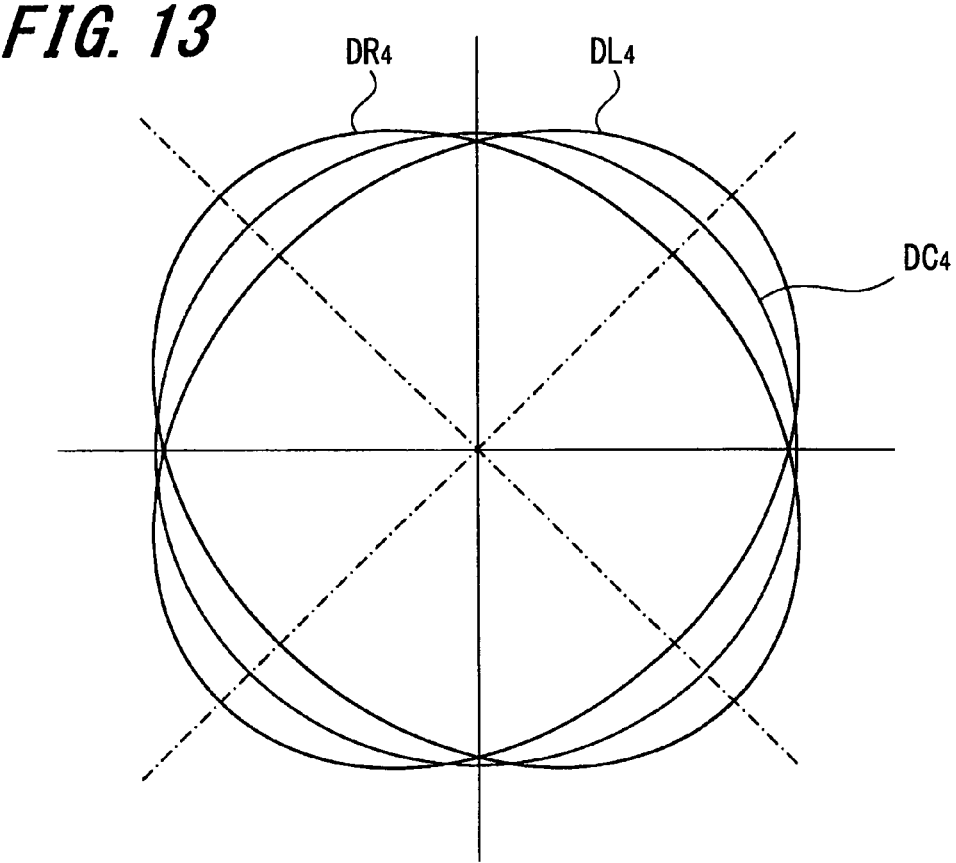
FIG. 13 is an explanatory drawing illustrating a difference in magnitude of distance dioptric power of progressive power lenses in Example 4 of the present invention, as a ratio likened to a circle.

From the same reasons described in the first embodiment, although any of the amounts HLELb and HLELc of left eye displacement, the amounts HRELb and HRELc of right eye displacement, and the amounts HCELb, HCELc, HCERb, and HCERc of reference displacement does not become a specific value, the mutual ratios between them can be calculated using the left distance dioptric power DL, right distance dioptric power DR, reference distance dioptric power DC, differential dioptric power ER for the right, differential dioptric power EL for the left, and a centre distance OP in Table 2. That is, HLELb/HCELb and HLELc/HCELc are ratios of the amounts of left eye displacement relative to the amounts of reference displacement respectively in the base direction and the cross direction of the EL lens (an adjustment ratio in the base direction for the left eye and an adjustment ratio in the cross direction for the left eye, respectively), and HRERb/HCERb and HRERc/HCERc are ratios of the amounts of right eye displacement relative to the amounts of reference displacement respectively in the base direction and the cross direction (an adjustment ratio in the base direction for the right eye and an adjustment ratio in the cross direction for the right eye, respectively).

becomes the short axial direction of the ellipse. In FIG. 13, the astigmatic axial direction (base direction) of the left eye distance lens and the direction orthogonal to that (cross direction) are illustrated by dash-dotted lines.

As is apparent from FIG. 13, the comparison of the magnitude of the left distance dioptric power DL4, the right distance dioptric power DR4, and the average power DC4 is determined differently depending on the direction. For example, in this case, the length in the astigmatic axial direction of the left distance dioptric power DL4 (long axis of the ellipse) is greater than the diameter of the circle of the average power DC4, and the length in the direction orthogonal to the astigmatic axis of the left distance dioptric power DL4 (short axis of the ellipse) is smaller than the diameter of the circle of the average power DC4. This applies to the right distance dioptric power DR4.

TABLE 2

|   |   |   | Example Number | | | |
|---|---|---|---|---|---|---|
|   |   |   | 4 | 5 | 6 | 7 |
| Left Distance Dioptric Power | Distance Spherical Dioptric Power for Left | DL-Sph[D] | −3.00 | −3.00 | +2.00 | +3.00 |
|   | Distance Cylindrical Dioptric Power for Left | DL-Cyl[D] | −1.00 | −1.00 | −1.00 | −2.00 |
|   | Distance Astigmatic Axial Direction for Left | DL-AX[Degree] | 45 | 180 | 45 | 90 |
| Right Distance Dioptric Power | Distance Spherical Dioptric Power for Left | DR-Sph[D] | −3.00 | −4.00 | −4.00 | +3.00 |
|   | Distance Cylindrical Dioptric Power for Left | DR-Cyl[D] | −1.00 | −2.00 | −2.00 | −1.00 |
|   | Distance Astigmatic Axial Direction for Left | DR-AX[Degree] | 135 | 90 | 45 | 120 |
| Reference Distance Dioptric Power | Reference Distance Spherical Dioptric Power | DC-Sph[D] | −3.50 | −4.00 | −1.00 | +2.91 |
|   | Reference Distance Cylindrical Dioptric Power | DC-Cyl[D] | 0.00 | −0.50 | −1.50 | −1.32 |
|   | Reference Distance Astigmatic Axial Direction | DC-AX[Degree] | 0 | 90 | 45 | 100 |
| Differential Dioptric Power for Left | Differential Spherical Dioptric Power for Left | EL-Sph[D] | +0.50 | +1.50 | +3.50 | +0.18 |
|   | Differential Cylindrical Dioptric Power for Left | EL-Cyl[D] | −1.00 | −1.50 | −0.50 | −0.87 |
|   | Differential Astigmatic Axial Direction for Left | EL-AX[Degree] | 45 | 0 | 135 | 75 |
| Differential Dioptric Power for Right | Differential Spherical Dioptric Power for Right | ER-Sph[D] | +0.50 | 0.00 | −3.00 | +0.68 |
|   | Differential Cylindrical Dioptric Power for Right | ER-Cyl[D] | −1.00 | −1.50 | −0.50 | −0.87 |
|   | Differential Astigmatic Axial Direction for Right | ER-AX[Degree] | 135 | 90 | 45 | 165 |
|   | Centre Distance | OP[mm] | 30.0 | 30.0 | 30.0 | 30.0 |
| Adjustment Ratio for Left Eye | Adjustment Ratio in Base Direction for Left Eye | HLELb/HCELb | 101.4% | 104.1% | 110.8% | 100.6% |
|   | Adjustment Ratio in Cross Direction for Left Eye | HLELc/HCELc | 98.7% | 100.0% | 109.6% | 97.9% |
| Adjustment Ratio for Right Eye | Adjustment Ratio in Base Direction for Right Eye | HRERb/HCERb | 101.4% | 100.0% | 92.0% | 102.2% |
|   | Adjustment Ratio in Cross Direction for Right Eye | HRERc/HCERc | 98.7% | 96.2% | 91.1% | 99.4% |

Three types of circle and ellipses drawn by solid lines in FIG. 13 represent right and left distance dioptric powers and average power thereof in a case of including cylindrical dioptric power in the right and left directions as DL4, DR4, and DC4. This aspect corresponds to Example 4 in Table 2. In this case, due to the presence of the cylindrical dioptric power, they become elliptical in shape having different sizes depending on the direction. Here, a direction of more minus dioptric power is defined as smaller dimensions. Accordingly, when expressing the cylindrical dioptric power in minus, the astigmatic axial direction becomes the long axial direction of the ellipse, and the direction orthogonal to the astigmatic axis For this reason, the design modification such as concentration and dispersion relative to the average dioptric power distribution and the astigmatism distribution, which are important steps of the present invention described in detail in the first embodiment, also turns out to be different between the base direction and the cross direction. That is, the concentration and dispersion in the second embodiment are not the simple enlargement and reduction maintaining the homothetic shapes described in the first embodiment but are enlargement and reduction having an orientation so as to make a circle into an ellipse.

In Example 4 in Table 2, since the distance cylindrical dioptric power DL-Cyl for the left and the distance cylindrical dioptric power DR-Cyl for the right are equal and the left distance astigmatic axis DL-AX and the right distance astigmatic axis DR-AX are orthogonal, the average dioptric power DC forms a spherical lens, with the astigmatic component cancelled. As a result, the direction of concentration and dispersion can be estimated easily to be astigmatic axial directions of the left and the right lenses and the directions orthogonal to them.

However, since it is difficult to determine the directions of concentration and dispersion in a case where the reference dioptric power DC becomes the cylindrical dioptric power or the astigmatic axial direction is different from the astigmatic axial directions of the left lens and the right lens, the directions are calculated by the following method.

In order to correctly determine the direction of concentration and dispersion for any combination of dioptric power, the lens to be a difference between the reference dioptric power DC and the left lens, and the lens to be a difference between the reference dioptric power DC and the right lens are virtually defined as the differential lens for the left (EL lens) and the differential lens for the right (ER lens), respectively. The subtraction of the DC lens (reference lens) from the DL lens (left lens) is the EL lens (differential lens for the left). In other words, the addition of the EL lens to the DC lens becomes the DL lens. This applies to the ER lens (differential lens for the right).

That is, since the DL lens is made by adding the dioptric power of the EL lens to the DC lens, the directions of concentration and dispersion are considered to be the astigmatic axial direction (EL-AX) of the EL lens and the direction orthogonal thereto. Regarding the determination as to concentration or dispersion, by comparing the dioptric powers of the DC lens and the DL lens in respective axial directions, when the left distance dioptric power DL in a certain axial direction is strong minus power (or weak plus power), it means concentration, and in the reverse situation, it means dispersion. This applies to the right distance dioptric power.

Here, the ratios of dispersion or concentration equivalent to the adjustment ratio for the left eye HLB/HC and the adjustment ratio for the right eye HRB/HC of Examples 1 through 3 described in Table 1 have to be considered by being divided into the base directions (astigmatic axial directions ELB and ERB) and the cross directions (directions orthogonal to the astigmatic axes ELc and ERc) of the EL lens and the ER lens as described above in Examples 4 to 7 where the cylindrical dioptric power is included. In Table 2 mentioned above, these reference characters are used as indexes. That is, the ratios of dispersion or concentration in Examples 4 to 7 in Table 2 are indicated by being divided into the base direction and the cross direction respectively in the right and left lenses, such as the adjustment ratio HLELb/HCELb in the base direction for the left eye, the adjustment ratio HLELc/HCELc in the cross direction for the left eye, the adjustment ratio HRERb/HCERb in the base direction for the right eye, and the adjustment ratio HRERc/HCERc in the cross direction for the right eye described above.

As just described, as an example of a method for designing lenses having different concentrations and dispersions depending on the axial direction, a method of using the Euler's formula in differential geometry below is considered.

$$D\theta = Db \cos^2\theta + DC \sin^2\theta \quad (5)$$

This is a method for obtaining a curve in an optional axial direction θ from two types of curves (Db: base curve, Dc: cross curve), and θ is a deflection angle from the astigmatic axial direction (base direction).

This formula can be applied as a method for synthesizing one astigmatic surface having power in the astigmatic axial direction of Db and power in the direction orthogonal to the astigmatic axis of Dc from a spherical surface having power of Db and a spherical surface having power of Dc. Further, this method is not limited to a spherical surface or an astigmatic surface, but can also be applied to synthesis of a complex curved surface such as a progressive surface or an aspherical surface having a progressive element.

That is, when substituting, in terms of the design surfaces of the DL lens (left lens) in Table 2,
a surface dispersed or concentrated by the adjustment ratio in the base direction for the left eye (HLELb/HCELb) as Db in the base direction of the EL lens,
a surface dispersed or concentrated by the adjustment ratio in the cross direction for the left eye (HLELc/HCELc) as Dc in the cross direction of the EL lens, and
a deflection angle from EL-AX as θ for the expression (5), which means that a cross-section Dθ at θ of the DL lens is established, and by developing it in terms of an optional θ, the design surfaces of the DL lens that are subjected to design modification of the present invention can be obtained.

This also applies to the DR lens.

That is, when substituting, in terms of the design surfaces of the DR lens (right lens) in Table 2,
a surface dispersed or concentrated by the adjustment ratio in the base direction for the right eye (HRERb/HCERb) as Db in the base direction of the ER lens,
a surface dispersed or concentrated by the adjustment ratio in the cross direction for the right eye (HRERc/HCERc) as Dc in the cross direction of the ER lens, and
a deflection angle from ER-AX as θ for the expression (5) which means that a cross-section Dθ at θ of the DR lens is established, and by developing it in terms of an optional θ, the design surfaces of the DR lens that are subjected to design modification of the present invention can be obtained.

As just described, in the second embodiment of the present invention, by modifying in design, such as concentrating and dispersing the average dioptric power distribution and the astigmatism distribution for the plano progressive power lenses at appropriate ratios described in Table 2, relative to the base direction and the cross direction of the differential lens respectively, through the intermediary of the reference lens, that is, by the adjustment ratio HLELb/HCELb in the base direction for the left eye, the adjustment ratio HLELc/HCELc in the cross direction for the left eye, the adjustment ratio HRERb/HCERb in the base direction for the right eye, and the adjustment ratio HRERc/HCERc in the cross direction for the right eye, two types of design surfaces are established which correspond respectively to the base direction and the cross direction of the differential lens (EL lens or ER lens), and they can be synthesized as one design surface by utilizing the Euler's formula and the like. By applying them to the right and left progressive power lenses, when the wearer views all directions of right-to-left and up-and-down with both eyes and even in a case where either of the right and left eyes or both eyes include cylindrical dioptric power, it is possible that the astigmatisms, the axial directions, the average dioptric powers, and the like by the right and left plano progressive power lenses relative to the lines of sight of the both eyes conform to each other. Accordingly, as described above, the binocular vision function of a wearer which used to be impaired due to the right and left dioptric power difference previously can be improved.

(1) EXAMPLE 4

In this example, the average dioptric power distribution and the astigmatism distribution by the plano progressive power lens of the reference dioptric power DC or the average dioptric power distribution and the astigmatism distribution by the plano progressive power lens of the left lens in Example 4 in Table 2 are defined as the ratios shown in Table 2. That is, the EL lens is dispersed at HLELb/HCELb=101.4% in the base direction (45°) and is concentrated at HLELc/HCELc=98.7% in the cross direction (135°) to define them as the average dioptric power distribution and the astigmatism distribution of the left progressive power lens.

Meanwhile, the average dioptric power distribution and the astigmatism distribution by the plano progressive power lens of the reference dioptric power DC or the average dioptric power distribution and the astigmatism distribution by the plano progressive power lens of the right lens are also defined as the ratios shown in Table 2. That is, the ER lens is dispersed at HRERb/HCERb=101.4% in the base direction (135°) and is concentrated at HRERc/HCERc=98.7% in the cross direction (45°) to define them as the average dioptric power distribution and the astigmatism distribution of the right progressive power lens.

By carrying out such modification as described above, the binocular vision function can be improved.

It should be noted that, as is shown from Table 2, the right and left distance spherical dioptric ers and the distance cylindrical dioptric powers are the same values in Example 4, while the right and left astigmatic axial directions are different. For this reason, even when the values of the adjustment ratios are the same, respectively, in the base direction and the cross direction for the left eye and the right eye, the directions to carry out the correction (right and left astigmatic axial directions) are different. That is to say, it is understood that, even in a case where only the astigmatic axial directions are different among the distance dioptric powers, the directions to carry out the correction of the adjustment ratios are different as just described.

Accordingly, compared with, for example, a pair of conventional progressive power lenses in which conditions such as the right and left distance dioptric powers are exactly the same as in Example 4, since the average dioptric power distribution and the astigmatism distribution are dispersed or concentrated due to the difference in the right and left astigmatic axial directions, it can be estimated easily that the average dioptric power distribution and the astigmatism distribution of the pair of progressive power lenses shown in Example 4 are different from those of the pair of conventional progressive power lenses.

(2) EXAMPLE 5

This is an example in which all of the left distance dioptric power DL, the right distance dioptric power DR, and the reference distance dioptric power DC have cylindrical dioptric power, and an example is shown in which all of the astigmatic axial directions are either horizontal or vertical.

Figure 14:
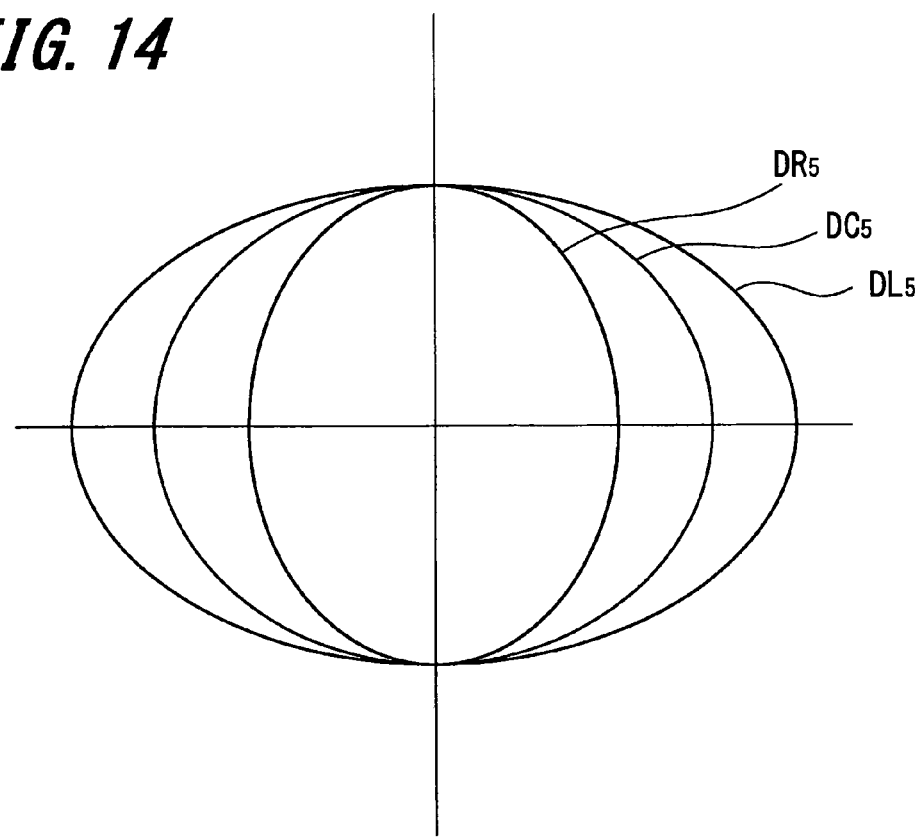
FIG. 14 is an explanatory drawing illustrating a difference in magnitude of distance dioptric power of progressive power lenses in Example 5 of the present invention, as a ratio likened to a circle.

FIG. 14 is a conceptual diagram illustrating the right and left distance dioptric powers and the average dioptric power thereof in Example 5 as DL5, DR5, and DC5. In FIG. 14 as well, a direction of a stronger minus dioptric power is defined as smaller dimensions.

As illustrated in Table 2, in this case, the base direction (0°) of the EL lens is dispersed at 104.1% and the cross direction (90°) is at 100.0%, that is, not dispersed and not concentrated to leave it as is, which are defined as the average dioptric power distribution and the astigmatism distribution of the left progressive power lens. In addition, the base direction (90°) of the ER lens is at 100.0%, that is, not dispersed and not concentrated to leave it as is, and the cross direction (180°) is concentrated at 96.2%, which are defined as the average dioptric power distribution and the astigmatism distribution of the right progressive power lens.

By carrying out such modification, similar to Example 4, the binocular vision function of the wearer which has been impaired due to the right and left dioptric power difference can be improved.

(3) EXAMPLE 6

This is an example in which all of the left distance dioptric power DL, the right distance dioptric power DR, and the reference distance dioptric power DC have cylindrical dioptric power, and an example is shown in which all of the astigmatic axial directions of DL, DR, and DC are in an identical diagonal direction (45°).

Figure 15:
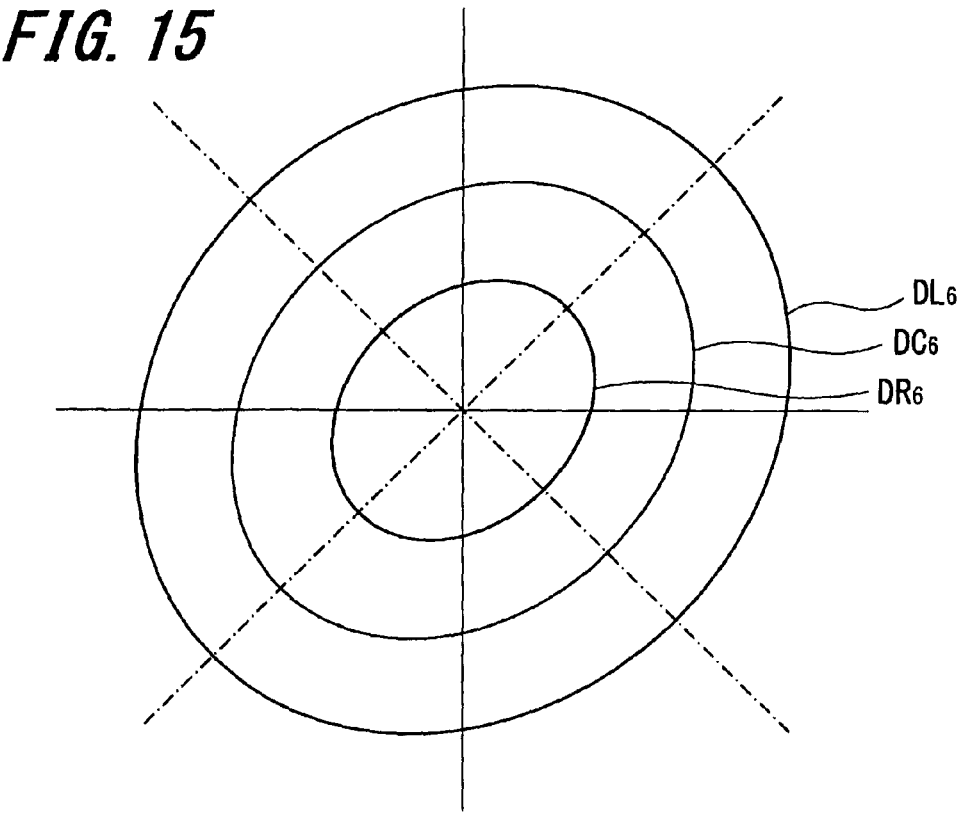
FIG. 15 is an explanatory drawing illustrating a difference in magnitude of distance dioptric power of progressive power lenses in Example 6 of the present invention, as a ratio likened to a circle.

FIG. 15 is a conceptual diagram illustrating the right and left distance dioptric powers and the average dioptric power thereof in Example 6 as DL6, DR6, and DC6. In FIG. 15 as well, a direction of a stronger minus dioptric power is defined as smaller dimensions. The astigmatic axial directions of the right and left lenses and the reference lens and the direction orthogonal to that are each illustrated by dash-dotted lines. It is understood that the astigmatic axial directions are in an identical direction and all become elliptical in shape having the long axial direction in an identical direction.

As shown in Table 2, in this case, the EL lens is dispersed in the base direction (135°) at 110.8% and in the cross direction (45°) at 109.6%, which are defined as the average dioptric power distribution and the astigmatism distribution of the left progressive power lens. In addition, the ER lens is concentrated in the base direction) (45°) at 92.0% and in the cross direction (135°) at 91.1%, which are defined as the average dioptric power distribution and the astigmatism distribution of the right progressive power lens.

By carrying out such modification, similarly, the binocular vision function of the wearer which has been impaired due to the right and left dioptric power difference can be improved.

(4) EXAMPLE 7

This is an example in which all of the left distance dioptric power DL, the right distance dioptric power DR, and the reference distance dioptric power DC have cylindrical dioptric power, and moreover, an example is shown in which all of the astigmatic axial directions are different.

Figure 16:
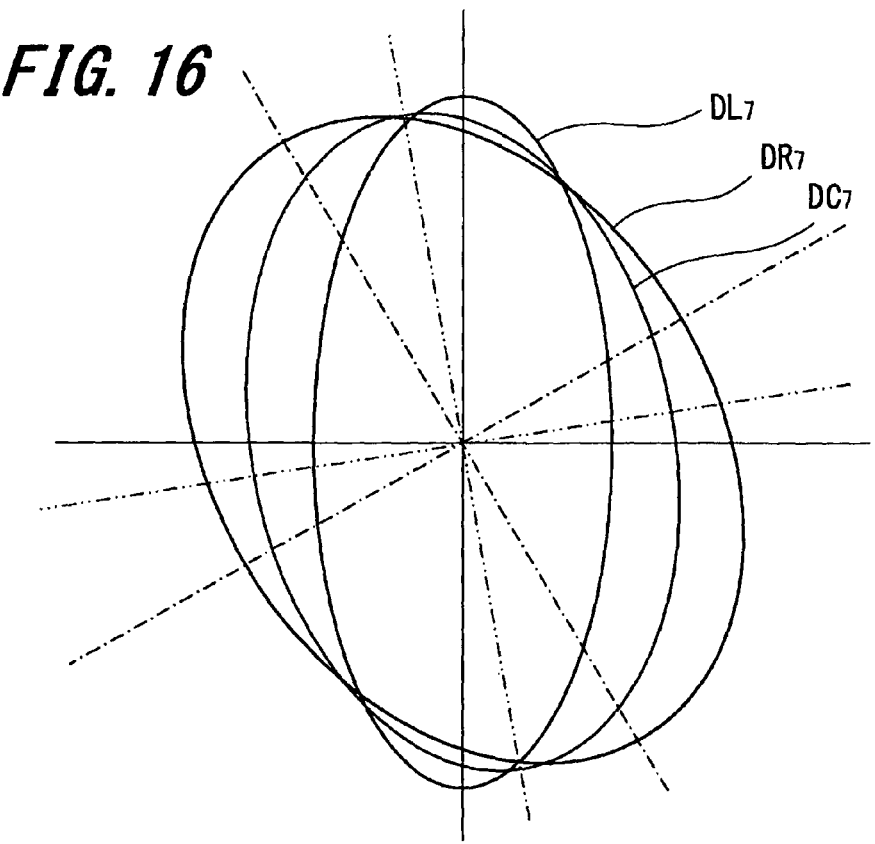
FIG. 16 is an explanatory drawing illustrating a difference in magnitude of distance dioptric power of progressive power lenses in Example 7 of the present invention, as a ratio likened to a circle.

FIG. 16 is a conceptual diagram illustrating the distance dioptric power for right and left in Example 7 and the average dioptric power thereof as DL7, DR7, and DC7. In FIG. 16 as well, a direction of a stronger minus dioptric power is defined as smaller dimensions. In FIG. 16, dash-dotted lines illustrate the astigmatic axial direction (base direction) of the right lens and the cross direction orthogonal to that, and dash-double dotted lines illustrate the astigmatic axial direction (base direction) of the reference lens and the cross direction orthogonal to that. Even in a case where all of the astigmatic axial directions are different in such a manner, similar to Examples 4 through 6, it is understood that they become elliptical in shape having the astigmatic axial directions of the right and left eyes as the long axial directions.

As shown in Table 2, in this case, the EL lens is dispersed in the base direction (75°) at 100.6% and is concentrated in the cross direction (165°) at 97.9%, which are defined as the average dioptric power distribution and the astigmatism distribution of the left progressive power lens. In addition, the ER lens is dispersed in the base direction (165°) at 102.2% and is concentrated in the cross direction (75°) at 99.4%, which are defined as the average dioptric power distribution and the astigmatism distribution of the right progressive power lens.

By carrying out such modification, similarly, the binocular vision function of the wearer which has been impaired due to the right and left dioptric power difference can be improved.

Figure 17A:
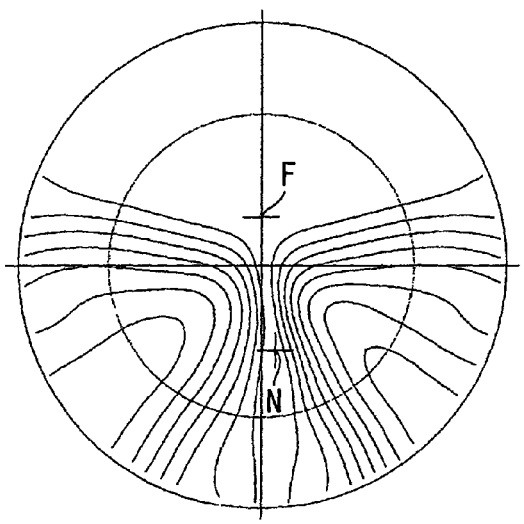
FIGS. 17A and 17B are diagrams illustrating standard astigmatism distribution and average dioptric power distribution of a progressive power lens according to an embodiment of the present invention.
Figure 17B:
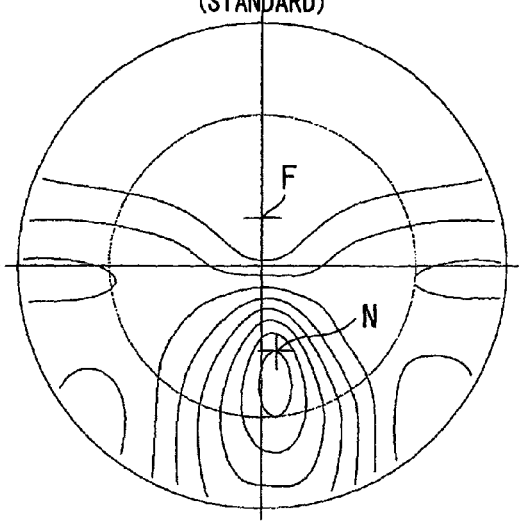
Figure 18A:
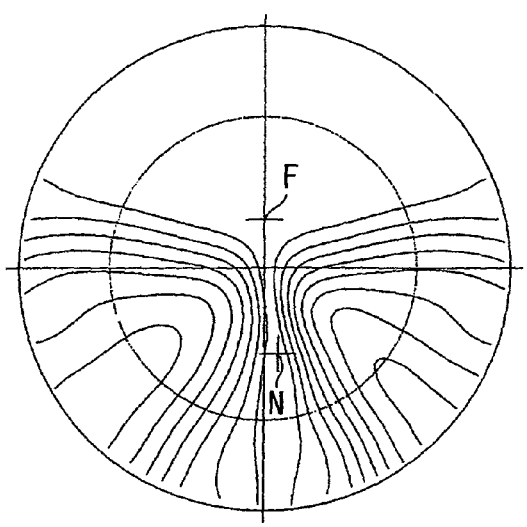
FIGS. 18A and 18B are diagrams illustrating an astigmatism distribution and average dioptric power distribution, subjected to enlargement processing, of a progressive power lens according to an embodiment of the present invention.
Figure 18B:
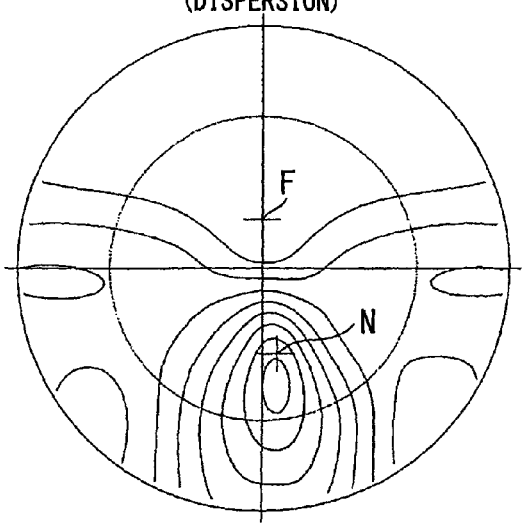
Figure 19A:
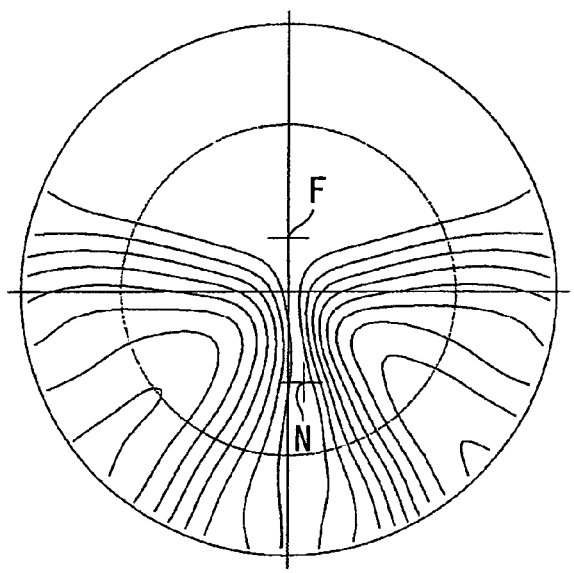
FIGS. 19A and 19B are diagrams illustrating an astigmatism distribution and an average dioptric power distribution, subjected to reduction processing, of a progressive power lens according to an embodiment of the present invention.
Figure 19B:
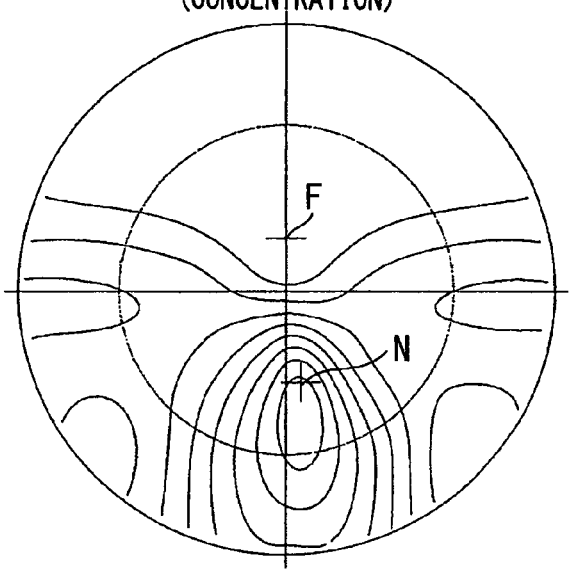

FIG. 17A to FIG. 19B illustrate each distribution, by way of example, in a case of dispersing or concentrating the average dioptric power distribution and the astigmatism distribution at ±10%. FIGS. 17A and 17B respectively illustrate the astigmatism distribution and the average dioptric power distribution at standard, that is, 100%, and FIGS. 18A and 18B respectively illustrate the astigmatism distribution and the average dioptric power distribution dispersed at 110%, and FIGS. 19A and 19B respectively illustrate the astigmatism distribution and the average dioptric power distribution concentrated at 90%. All of the two crossing lines indicated by F and N in FIGS. 17A and 17B, FIGS. 18A and 18B, and FIGS. 19A and 19B illustrate measurement positions of the distance dioptric power and the near dioptric power relative to FIGS. 17A and 17B. In addition, the circles drawn at the centers of FIGS. 17A and 17B, FIGS. 18A and 18B, and FIGS. 19A and 19B have a diameter of 50 mm, and are to describe the situations of dispersion and concentration for the astigmatism and the average dioptric power by being compared and contrasted, and they are all indicated in the same position and the same dimensions.

It is understood that, in both of the astigmatism distribution and the average dioptric power distribution, the distribution is dispersed vertically and horizontally in the dispersion, and the distribution is concentrated vertically and horizontally in the concentration. Meanwhile, since the ratio of dispersion or concentration is multiplied to the base curve and the addition power (or an element of the addition power) as a factor in advance, predetermined base curve and addition power (or an element of the addition power) are maintained.

Although the average dioptric power of the right and left distance dioptric powers is used as a method for determining the reference dioptric power DC in Example 1 to Example 7 described above, other dioptric power can also be selected in the present invention. For example, it is possible to conform to the distance dioptric power on the side of the dominant eye of the wearer or select dioptric power among the right and left distance dioptric powers in a nonstep manner depending on the degree of the dominant eye. In addition, it is also possible to define DC=0.00 regardless of the prescribed dioptric power of the wearer. In this case, it means that a plano progressive power lens having distance dioptric power set as zero is defined as the reference dioptric power.

In addition, although the spherical dioptric power is used as the prescribed dioptric power in Examples 1 to 3 described above, and the spherical dioptric power, the cylindrical dioptric power, and the axial directions of the cylindrical dioptric power are used as the prescribed dioptric power in Examples 4 to 7, it is not limited to them. Other than those, the prismatic power and the axial directions of the prismatic power may also be used as the prescribed dioptric power, and a part of them may be used, and it is also possible to use all of them.

Further, as the wear state, the distance OP between the center of rotation of eye for the right and the left lenses and the intersection of the line of sight of frontal vision with the outer surface of the lens is used in Examples 1 to 7 described above.

Although the distance OP is supposed to be identical for the right and the left lenses in each example described above, the ratios may also be derived using different distances. In addition, the wear state is not limited to such a distance, and it is also possible to derive the ratios more accurately using the vertex distances (CVD) of the right and left eyes, the distances (CR) from the centers of rotation of eye to the cornea vertices, the monocular pupillary distances (half PD), and the like.

It should be noted that the surface on the object side of the pair of right and left progressive power lenses of the present invention may also be identical or mirror-symmetrical to each other. To such a pair of progressive power lenses as well, the present invention can be applied by carrying out the correction of the present invention to the surfaces on the sides of the eyes. In addition, the present invention can be applied by carrying out the correction of the present invention only to the surfaces on the sides of the object while applying a conventional technique to the surfaces on the sides of the eyes, and further carrying out the correction of the present invention to the surfaces on both sides.

As described above, by using the progressive power lenses of the present invention, the astigmatism, the axial directions, the average dioptric power, and the like at the positions PLB and PRB of predetermined side vision by the plano progressive power lenses from which the right and left distance dioptric power components have been eliminated conform to each other, and the function of binocular vision is less impeded in comparison with conventional techniques, and the original binocular vision function possessed by the visual system of the spectacle wearer becomes fully achieved.

It should be noted that, although a case of calculating the adjustment ratios by using the lens L2 illustrated in FIG. 9 as a plano progressive power lens having distance dioptric power of zero in each of the Examples mentioned above, they are not limited to this as described above. That is, as the distance dioptric power of the lens L2, the right and left average dioptric powers and reference dioptric powers may be employed.

In addition, similarly, although a case is shown that the points (PL0 and PR0) as the starting points of the amounts of displacement used for calculating the adjustment ratios are defined as the optical centre points in each Example mentioned above, they are not limited to them as described above, and for example, it is possible to define them to be the prism reference points.

Figure 20:
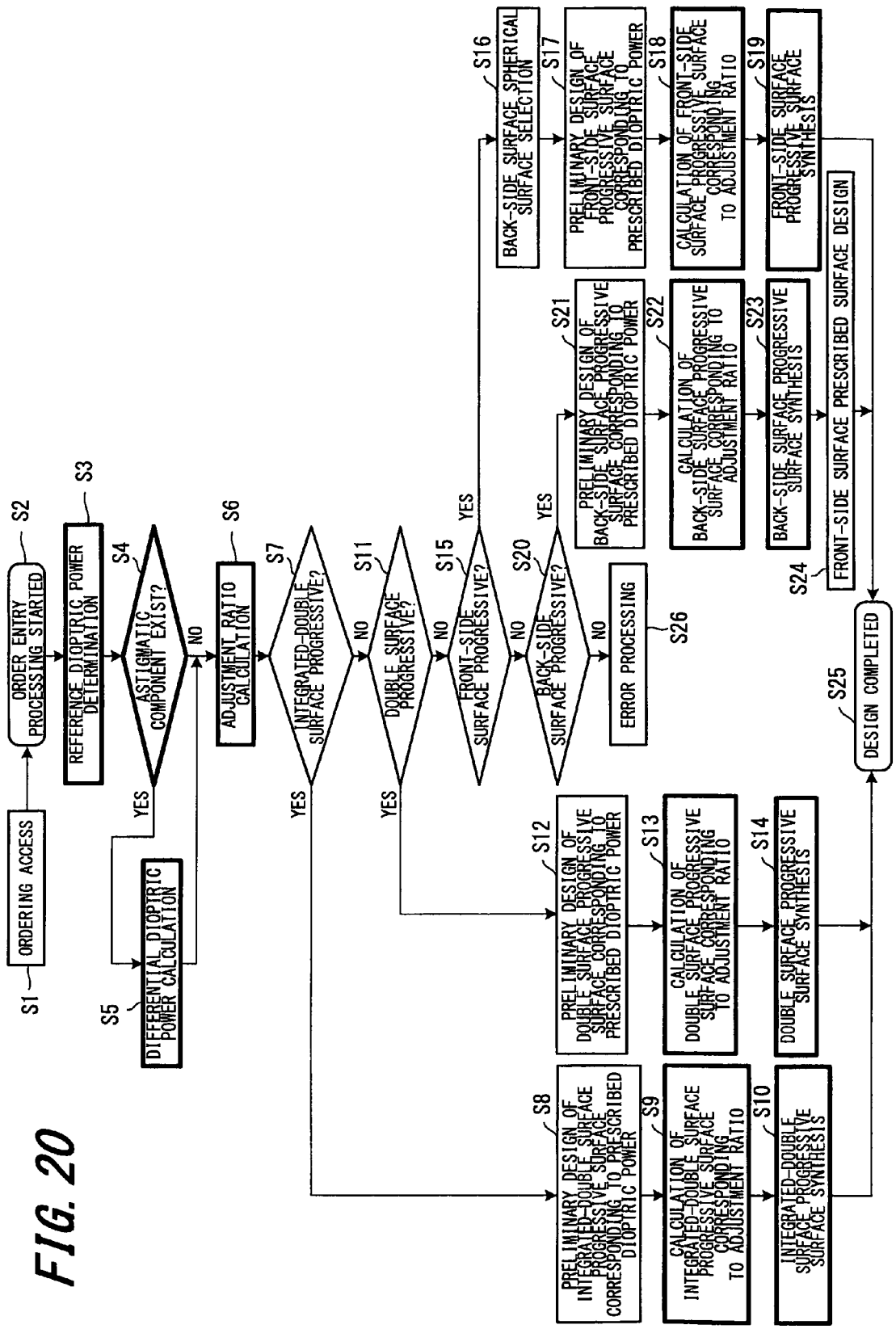
FIG. 20 is a diagram showing a flowchart of a method for designing a progressive power lens according to an embodiment of the present invention.
Figure 21:
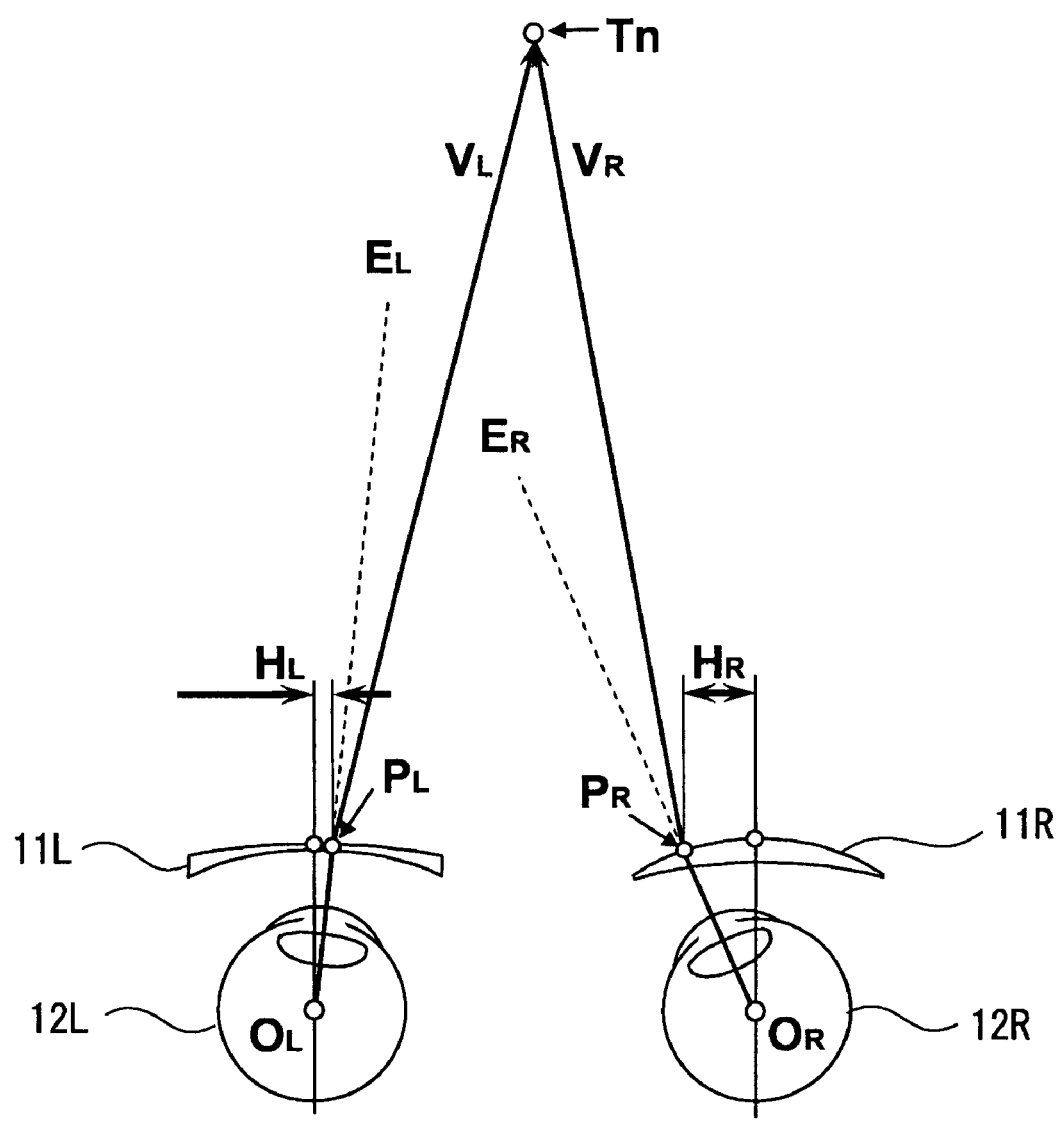
FIG. 21 is an explanatory drawing illustrating displacement of lines of sight of both eyes in near vision with a pair of conventional progressive power lenses.

Next, a description will be given to a designing method of one embodiment of the present invention on the basis of a flowchart shown in FIG. 20.

(Step 1)

First, by a visit of a client to a store, an "ordering access" is performed from a spectacle shop to a lens manufacturer. This ordering access informs the lens manufacturer of the prescribed dioptric powers of the right and left eyes, the degree of the dominant eye, the state of wearing the spectacles, other information of use by the wearer, and the like. It should be noted that the prescribed dioptric power is a numerical value obtained by optometry at a spectacle shop. The wear state is a position of the spectacles determined depending on the shape of the face of a person and the like, which may be sent to the lens manufacturer as "leave it up to you", which is not specified especially.

In addition, in this ordering access in a step S1, information on design specification is provided as to what type of lens of progressive power specification is to be designed, that is, whether it is "integrated-double surface progressive power lens", "both-surface progressive power lens", "back surface side progressive power lens", or "front surface side progressive power lens".

Here, a description will be given to these four design specifications. First, the first "integrated-double surface progressive power lens" specification is a specification developed by the present inventors and of a lens creating an effect of a progressive power lens compositely on both surfaces of front and back by configuring both the object side front side and the eye side back side to have an aspherical lens (refer to, for example, Japanese Patent Publication No. 3617004 and WO/2006137489). This is a specification for providing prescribed progressive power compositely on both surfaces of front and back by providing only a component of vertical progressive power, for example, in the outer surface (front side) of a integrated-double surface progressive power lens and providing only a component only of horizontal progressive power in the inner surface (back side) of the lens.

The second "both-surface progressive power lens" specification is a specification for providing prescribed progressive power by using a combined value of the progressive power of each progressive surface by defining both the outer surface (front side) and the inner surface (back side) of a lens as progressive surfaces (refer to, for example, Japanese Unexamined Patent Application Publication No. 2000-155294 and Japanese Unexamined Patent Application Publication No. 2000-249992).

The third "back surface side progressive power lens" specification is a specification for forming a progressive surface corresponding to the prescribed dioptric power in a concave portion in the backside of a lens (refer to, for example, Japanese Patent Publication No. 3852116 and Japanese Unexamined Patent Publication No, 10-206805).

The fourth "front surface side progressive power lens" specification is a specification for forming a progressive surface corresponding to prescribed dioptric power in a convex portion in the fore face of a lens (refer to, for example, Japanese Patent Publication No. 3196877 and Japanese Patent Publication No. 3196880). At present, all of the progressive power lens specifications are considered to be classified into any of the above four types, and the design of a progressive power lens that follows is carried out in accordance with any of these specifications. It should be noted that the present invention can also be applied to progressive power lenses having structures other than these four types as long as they have a design surface to define the astigmatism distribution and the average dioptric power distribution.

(Step 2)

Following this ordering access, an order entry process is started by the lens manufacturer. That is, the lens manufacturer having received an order from the client carries out various processing accompanied by the entry of order (order entry processing).

(Step 3)

In the "order entry process", a process for "determination of reference dioptric power" is carried out, which is a particularly important process in the designing method of the present invention.

Generally, viewing an object means that two types of right and left optical information entering into both eyes are transmitted to the brain through the eyeballs, the retina, the optic nerve, and the like to be recognized as one stereoscopic fusional image. Here, reference dioptric power (DC) means virtual dioptric power when an eye having certain dioptric power (that is to say, "reference dioptric power") is assumed to view something monocularly.

That is, the reference dioptric power is third dioptric power being different from both the dioptric power of the right eye and the power of the left eye, and is normally supposed to be an additive average value of the right and left dioptric powers. In this regard, in a case where a "dominant eye" exists in the right and left eyes, it can be a weighted average value weighted depending on the degree. The reference dioptric power is modified by the contents of the ordering access in the step S1.

Since it is a principal object of the designing method in an embodiment of the present invention to improve the binocular vision performance in the eyes having different right and left prescribed dioptric power values, the reference dioptric power is important that is a reference to reduce the difference between the right and left eyes. That is, without adapting the right eye to the left eye or without adapting the left eye to the right eye, appropriate reference dioptric power is provided in advance to adapt the power of each of the right and left eyes to the reference dioptric power by compensating the dioptric power of each of the right and left eyes for each other. Thus, it is intended to improve the binocular vision performance. Here, since the prescribed dioptric power values themselves of the right and left eyes cannot be changed even when adapting the dioptric power of each of the right and left eyes to the reference power, the dioptric power of each of the right and left eyes is adapted to the reference dioptric power by changing design elements of the right and left spectacle lenses except them, that is, by changing the astigmatism distribution, average dioptric power distribution, and the like.

(Step 4)

At the stage of terminating the determination of the "reference dioptric power" in the step S3, whether or not the right and left eyes have astigmatism is determined.

(Step 5)

In a case of designing a pair of right and left progressive power lenses with cylindrical dioptric power, necessity occurs to calculate a difference between the dioptric power for the right eye and the reference dioptric power, and a difference between the dioptric power of the left eye and the reference dioptric power. First, in this step S5, differential dioptric powers are calculated, a difference between the right prescribed dioptric power and the reference dioptric power, and a difference between the left prescribed dioptric power and the reference dioptric power. Here, two types of differential dioptric power for the right eye and the left eye (ER for right and EL for left) are calculated. It should be noted that, as shown in Example 4 described above, in a case where the prescribed dioptric power values for the right and left eyes are cylindrical dioptric power, although the differential dioptric power is not always the cylindrical dioptric power, the differential dioptric power is generally cylindrical dioptric power.

It should be noted that, in a case where the prescribed dioptric power values for the right and left eyes are spherical dioptric powers, since no difference occurs depending on the directions in the calculation of the adjustment ratios to be carried out next, the step 5 of this "differential dioptric power calculation" is not necessary.

(Step 6)

After the calculation of reference dioptric power in the step S3 or the calculation of differential dioptric power in the step S5 in a case where the cylindrical dioptric power exists is terminated, ratios of the amounts of displacement on the lenses of the lines of sight from the reference dioptric power and the prescribed dioptric power are subsequently calculated. This is "adjustment ratio calculation" processing. That is, as the adjustment ratio to be a design measure, the ratio described in the first or second embodiment described above is caluculated. Here, in a case where cylindrical dioptric power is included and the differential dioptric power is calculated in the step S5, two types of adjustment ratios exist for a base direction and a cross direction relative to each of the lenses for the right and left eyes. Accordingly, four types of adjustment ratios in total, that is, ratios, turn out to be calculated. It should be noted that the base direction is an astigmatic axial direction of the differential lens as described above, and the cross direction is a direction perpendicular to this base direction.

From the step S3 to the step S6 are the steps for acquiring basic data that is effective for the following design of a pair of progressive power lenses. On the basis of the data, specific modification (correction) is carried out on the design surfaces of the right and left lenses.

(Step 7 Through Step 10)

First, in a case where the pair of progressive power lenses subjected to the order entry for design are "integrated-double surface progressive" (Yes in a step S7), preliminary design of integrated-double surface progressive surfaces is carried out in accordance with the prescribed dioptric power for both the right and left lenses (step S8). Then, the design surfaces of the preliminary design obtained in the step S8 are multiplied by the adjustment ratios already calculated in the step S6 to calculate integrated progressive surfaces (step S9). Here, in a case of "integrated-double surface progressive", since four types (two types of the differential dioptric power for the base direction and the cross direction for each of the right and left eyes) of adjustment ratios described above are applied to both surfaces of the outer surface (front side) and the inner surface (back side), there are eight types in total.

Finally, processing of "synthesis into one design surface" of the design surfaces for the base direction and the cross direction by a method of utilizing the Euler's formula or the like is performed for each of the right and left eyes (step S10). Thus, the design of the pair of progressive power lenses in a case of the order entry for "integrated-double surface progressive" is completed (step S25). It should be noted that a method for specifically processing these design surfaces is not at all different from conventional techniques for processing a free form surface.

(Step 11 Through Step 14)

Next, in a case where the order entry is "both-surface progressive" (Yes in the step S11), similar to the step S8, preliminary design of both-surface progressive surfaces is performed in accordance with the prescribed dioptric power of the right lens and the left lens (step S12). In this step S12, progressive surfaces of the outer surfaces are designed on the basis of the average dioptric power (dioptre) in the vertical direction and the horizontal direction on the outer surfaces (front sides) of the right and left lenses, and also progressive surfaces turn out to be designed on the basis of the average dioptric power (dioptre) in the vertical direction and the horizontal direction similarly on the inner surfaces (back sides) of the lenses. In this case of "both-surface progressive" as well, the progressive surfaces of the right and left lenses turn out to be designed on the basis of four types in a case where no cylindrical dioptric power exists and eight types of adjustment ratios in total in a case where cylindrical dioptric power exists as a total of two types for the right and left eyes, two types for the base direction and the cross direction in a case where cylindrical dioptric power exists, and two types of the outer surface (front side) and the inner surface (back side).

Subsequently, in accordance with the adjustment ratios obtained in the step S6, the progressive surfaces of the outer surface and the inner surface are calculated and designed (step S13). Finally, the synthesis of progressive surfaces of the outer surface and the inner surface is carried out by a method of utilizing the Euler's formula or the like (step S14) to complete the design.

(Step 15 Through Step 19)

Next, in a case where the order entry is "back surface side progressive" (Yes in the step S15), since design is carried out, while fixing the outer surface, to make a progressive surface only in the inner surface, the selection of outer-surface spherical surfaces of the right and left lenses is carried out initially (step S16).

After the outer-surface spherical surfaces are selected in the step S16, preliminary design of the inner-surface progressive surfaces of the right and left lenses is carried out next in accordance with the prescribed dioptric power of the right and left lenses (step S17). Then, the inner-surface progressive surfaces of the right and left lenses are calculated corresponding to the adjustment ratios calculated in the step S6 (step S18). Here, since the adjustment ratios are four types including two types of the right and left lenses and two types of the inner surfaces for the base direction and the cross direction in a case of the base direction and the cross direction where cylindrical dioptric power exists, the adjustment ratios are half of cases of the "integrated-double surface progressive" and the "both-surface progressive" already described. As the calculation of the right and left inner-surface progressive surfaces is terminated in the step S18, synthesis of the inner-surface progressive surfaces is carried out by a method of using the Euler's formula or the like (step S19) to complete the design.

(Step 20 Through Step 24)

Finally, in a case where the order entry specification is "outer-surface progressive surface" (Yes in the step S20), preliminary design of outer-surface progressive surfaces of the right and left lenses is carried out in accordance with the prescribed dioptric power of the right lens and the left lens (step S21). Then, outer-surface progressive surfaces of the right and left lenses are calculated corresponding to the adjustment ratios calculated in the step S6 (step S22). The adjustment ratios used in the design of outer-surface progressive surfaces are also four types including two types of the right and left lenses and two types for a base direction and a cross direction of respective outer surfaces in a case where cylindrical dioptric power exists. As the calculation of the right and left outer-surface progressive surfaces is terminated in this step S22, synthesis of the outer-surface progressive surfaces is carried out by a method of, for example, the Euler's formula or the like (step S23). Then, last of all, "inner-surface prescribed surface design" is performed, which carries out design in response to astigmatism in the inner surface, that is, the back side (concave portion) of the right and left lenses (step S24), to complete the design.

It should be noted that, in a case of not falling into any of the steps S7, S11, S15, and S20 (case of No to all), it is processed as an error (step S26). In this regard, the present invention is applicable to a case of designing the astigmatism distribution and the average dioptric power distribution of the progressive power lenses having a structure other than the four types mentioned above. In that case, they can be designed similar to the present invention by providing a step of carrying out preliminary design on the basis of the prescribed dioptric power and the wear state, and a step of carrying out calculation of the progressive surfaces of the right and left lenses corresponding to the adjustment ratios by applying the present invention.

According to the pair of progressive power lenses having a configuration of the present invention designed by the designing method above, as described above, the deterioration in the binocular vision function is reduced by changing the design, such as the average dioptric power distribution and the astigmatism distribution of the spectacle lenses, while maintaining the prescribed dioptric power for the right and left eyes.

It should be noted that the present invention is not limited to the configurations described in each embodiment described above, but a variety of modifications and alterations are possible within a scope not departing from the configuration of the present invention.

DESCRIPTION OF REFERENCE CHARACTERS

1L ... Lens for Left Eye, 1R ... Lens for Right Eye, 2L ... Left Eye, 2R ... Right Eye

The invention claimed is:

1. A pair of progressive power lenses, comprising different right and left distance dioptric powers, wherein in a case where lens components of the pair of progressive power lenses are divided into a pair of progressive power lens components having equal right and left distance dioptric powers and addition powers and a pair of single-vision lens components having different right and left dioptric powers, in response to a ratio of displacement distances of lines of sight of right and left eyes calculated on lenses having the single-vision lens components when wearing the lenses and moving lines of sight from a front distance to a distance other than a front towards a predetermined azimuthal angle, an average dioptric power distribution and an astigmatism distribution of a lens component for a single eye or both eyes of lenses having the progressive power lens components are corrected, and thereby occurrence of aberration other than a difference of the right and left distance dioptric powers is suppressed in differences of average dioptric power and astigmatism relative to right and left lines of sight in binocular vision.

2. The pair of progressive power lenses according to claim 1, wherein dioptric power of the single-vision lens components is spherical dioptric power for both right and left lenses, and the predetermined azimuthal angle is an arbitrary azimuthal angle.

3. The pair of progressive power lenses according to claim 1, wherein one or both of right and left dioptric powers among the dioptric powers of the single-vision lens components include cylindrical dioptric power, and the predetermined azimuthal angle is defined as a base direction and a cross direction in a lens having a lens component obtained by optically subtracting lens dioptric power with half of synthesis dioptric power obtained by overlapping a left eye lens component and a right eye lens component of the single-vision lens components from dioptric powers of right and left lens components of a lens pair having the single-vision lens components.

4. A method for designing a pair of progressive power lenses having different right and left distance dioptric powers, comprising the steps of:
dividing lens components of the pair of progressive power lenses into a pair of progressive power lens components having equal right and left distance dioptric powers and addition powers, and a pair of single-vision lens components having different right and left dioptric powers;
calculating, in a case of wearing lenses having the single-vision lens components for binocular vision, ratios of displacement distances of lines of sight on the lenses for right and left eyes when moving the lines of sight from a front distance to a distance other than a front towards a predetermined azimuthal angle; and
carrying out correction in accordance with the ratios to an average dioptric power distribution and an astigmatism distribution of a lens component for a single eye or both eyes of lenses having the progressive power lens components,
wherein occurrence of aberration other than a difference of the right and left distance dioptric powers is thereby suppressed in differences of average dioptric power and astigmatism relative to right and left lines of sight in binocular vision.

5. The method for designing a pair of progressive power lenses according to claim 4, wherein in a case where dioptric power of the single-vision lens components is spherical dioptric power for both right and left lenses, the average dioptric power distribution and the astigmatism distribution are enlarged or reduced uniformly in a direction of an arbitrary azimuthal angle as correction for the progressive power lens components.

6. The method for designing a pair of progressive power lenses according to claim 4, wherein within a visual field region of a lens center diameter of at least 30 mm, differences between the difference of the right and left distance dioptric powers and differences of the average dioptric power distribution and the astigmatism distribution relative to the right and left lines of sight in binocular vision are each defined as being within 0.25 dioptres.

7. The method for designing a pair of progressive power lenses according to claim 4, wherein the different right and left distance dioptric powers in the pair of progressive power lenses include any one or pluralities of distance spherical dioptric power, distance cylindrical dioptric power, distance astigmatic axial direction, prismatic power, and axial direction of prismatic power.

8. The method for designing a pair of progressive power lenses according to claim 4, wherein in a case where one or both of right and left dioptric powers among the dioptric powers of the single-vision lens components include cylindrical dioptric power, the average dioptric power distribution and the astigmatism distribution are enlarged or reduced elliptically so as have different scales in a direction of a predetermined azimuthal angle as correction for the progressive power lens components.

9. The method for designing a pair of progressive power lenses according to claim 8, wherein the direction of the predetermined azimuthal angle is defined as a base direction and a cross direction in a differential lens having a lens component obtained by optically subtracting a reference dioptric power from dioptric powers of right and left lens components of a lens pair having the single-vision lens components.

10. The method for designing a pair of progressive power lenses according to claim 9, wherein the reference dioptric power is lens dioptric power with half of synthesis dioptric power obtained by overlapping a left eye lens component and a right eye lens component of the single-vision lens components.

* * * * *